US012615680B2

(12) United States Patent
Wang et al.

(10) Patent No.: US 12,615,680 B2
(45) Date of Patent: Apr. 28, 2026

(54) NETWORK ACCESS METHOD AND TERMINAL

(71) Applicant: Honor Device Co., Ltd., Shenzhen (CN)

(72) Inventors: Xin Wang, Shenzhen (CN); Yajun Yu, Shenzhen (CN); Feng Wang, Shenzhen (CN); Ting Kang, Shenzhen (CN); Bing Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 526 days.

(21) Appl. No.: 17/908,754

(22) PCT Filed: May 14, 2021

(86) PCT No.: PCT/CN2021/093888
§ 371 (c)(1),
(2) Date: Sep. 1, 2022

(87) PCT Pub. No.: WO2021/228238
PCT Pub. Date: Nov. 18, 2021

(65) Prior Publication Data
US 2023/0128087 A1 Apr. 27, 2023

(30) Foreign Application Priority Data

May 14, 2020 (CN) .......................... 202010405578.0
Jun. 15, 2020 (CN) .......................... 202010544883.8

(51) Int. Cl.
*H04W 76/19* (2018.01)
*H04W 76/15* (2018.01)
*H04W 88/06* (2009.01)

(52) U.S. Cl.
CPC ........... *H04W 76/19* (2018.02); *H04W 76/15* (2018.02); *H04W 88/06* (2013.01)

(58) Field of Classification Search
CPC ..... H04W 88/06; H04W 8/183; H04W 76/27; H04W 68/005; H04W 76/15;
(Continued)

(56) References Cited

U.S. PATENT DOCUMENTS 9,775,082 B1 9/2017 Chakraborty et al.
11,184,827 B2 11/2021 Liu et al.
(Continued)

FOREIGN PATENT DOCUMENTS

CN 106028309 A 10/2016
CN 109246834 A 1/2019
(Continued)

OTHER PUBLICATIONS

Ericsson, et al., "Return to NR from EPS/RAT fallback", 3GPP TSG-SA WG2 Meeting #133, S2-1906393, (Rev of S2-1906374), May 13-17, 2019, 3 Pages, Reno, Nevada.
Apple, "R17 Multi-SIM", 3GPP TSG RAN Meeting #85, RP-192175, Sep. 16-20, 2019, 3 Pages, Newport Beach, USA.

*Primary Examiner* — Kwasi Karikari
(74) *Attorney, Agent, or Firm* — Slater Matsil, LLP

(57) ABSTRACT

This specification relates to the field of mobile communications technologies, and specifically to a network access method and a terminal. The method is applied to a terminal that is connected to the primary access network device and the secondary access network device through the first SIM card, and is connected to the secondary access network device. The method includes: disconnecting, by the terminal, an RRC connection between the terminal and the secondary access network equipment when the terminal executes a first service through the second SIM card; determining, by the terminal, that the first service ends; and actively disconnecting, by the terminal, an RRC connection between the terminal and the primary access network equipment, and sending an RRC connection re-establishment (Continued)

request, so that the terminal is reconnected to the secondary access network equipment through the first SIM card with assistance of the primary access network equipment.

20 Claims, 12 Drawing Sheets

(58) Field of Classification Search
CPC . H04W 60/005; H04W 8/24; H04W 36/0085; H04W 36/362; H04W 4/60; H04W 72/1215; H04W 36/00692; H04W 72/23; H04W 24/10; H04W 76/30; H04W 72/0446; H04W 76/19; H04W 24/02; H04W 92/18; H04W 36/0055; H04W 36/0064; H04W 36/00698; H04W 60/04; H04W 48/18; H04W 36/08; H04W 76/20
See application file for complete search history.

(56) References Cited

U.S. PATENT DOCUMENTS

| | | | |
|---|---|---|---|
| 11,445,359 B2 | 9/2022 | Jha et al. | |
| 2014/0141839 A1* | 5/2014 | Larsson | H04W 48/04 |
| | | | 455/558 |
| 2015/0341946 A1* | 11/2015 | Chong | H04W 48/16 |
| | | | 455/450 |
| 2019/0053293 A1* | 2/2019 | Akoum | H04W 72/23 |
| 2020/0068639 A1 | 2/2020 | Kim et al. | |
| 2021/0314858 A1* | 10/2021 | Wong | H04W 88/16 |
| 2022/0014953 A1 | 1/2022 | Teyeb et al. | |

FOREIGN PATENT DOCUMENTS

| | | |
|---|---|---|
| WO | 2019095119 A1 | 5/2019 |
| WO | 2020045952 A1 | 3/2020 |
| WO | 2020091660 A1 | 5/2020 |

* cited by examiner

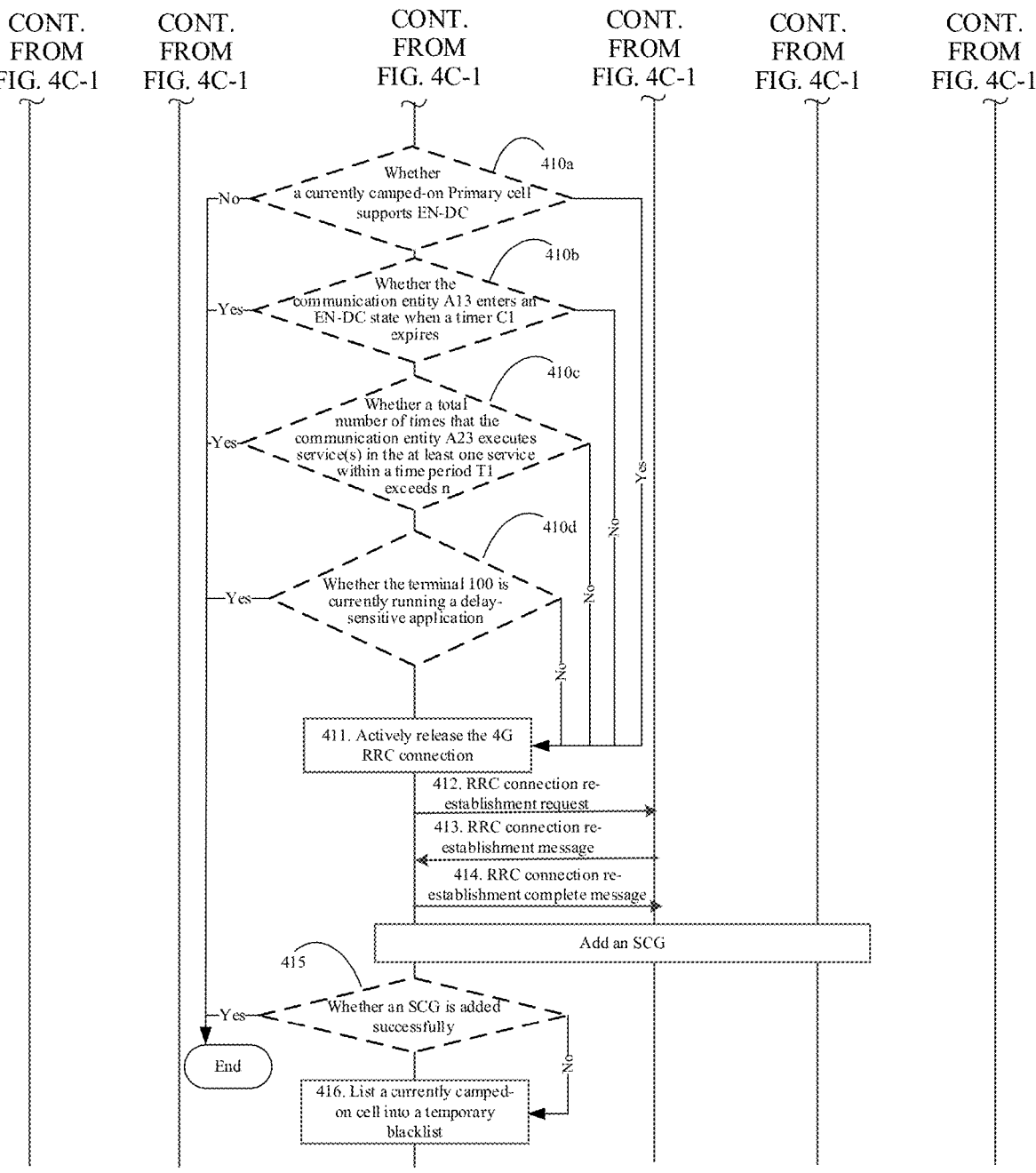

CONT.
FROM
FIG. 4C-1

CONT.
FROM
FIG. 4C-1

CONT.
FROM
FIG. 4C-1

CONT.
FROM
FIG. 4C-1

CONT.
FROM
FIG. 4C-1

CONT.
FROM
FIG. 4C-1

Whether
a currently camped-on Primary cell
supports EN-DC — No — 410a

Whether the
communication entity A13 enters an
EN-DC state when a timer C1
expires — Yes — 410b Whether a total
number of times that the
communication entity A23 executes
service(s) in the at least one service
within a time period T1
exceeds n — Yes — 410c Whether the terminal 100 is
currently running a delay-
sensitive application — Yes — 410d 411. Actively release the 4G
RRC connection 412. RRC connection re-
establishment request 413. RRC connection re-
establishment message 414. RRC connection re-
establishment complete message Add an SCG

415

Whether an SCG is added
successfully — Yes

End

416. List a currently camped-
on cell into a temporary
blacklist

FIG. 4C-2

NETWORK ACCESS METHOD AND TERMINAL

CROSS-REFERENCE TO RELATED APPLICATIONS

This application is a National Stage of International Application No. PCT/CN2021/093888, filed May 14, 2021, which claims priority to Chinese Patent Application No. 202010405578.0, filed May 14, 2020, and Chinese Patent Application No. 202010544883.8, filed Jun. 15, 2020. All of the aforementioned applications are hereby incorporated by reference in their entireties.

TECHNICAL FIELD

This specification relates to the field of mobile communications technologies, and specifically to a network access method and a terminal.

BACKGROUND

The 5-th generation (5th generation, 5G) network architecture can be divided into two networking modes: non stand-alone (non stand-alone, NSA) and stand-alone (stand-alone, SA). In the NSA networking mode, a 5G carrier is added on the basis of long term evolution (long term evolution, LTE), and the 5G carrier can be used to carry user plane data.

For the NSA networking mode, the third generation partnership project (third generation partnership project, 3GPP) release (release, R) 15 defines a dual connectivity (dual connectivity, DC) framework for long term evolution (long term evolution, LTE) and new radio (new radio, NR), which includes an evolved universal terrestrial radio access network (evolved universal terrestrial radio access network, E-UTRAN)—NR dual connectivity (E-UTRA—NR dual connectivity, EN-DC) architecture. In the early stage of 5G network deployment, most operators chose the EN-DC architecture as the NSA networking mode. The EN-DC architecture does not need to add a 5-th generation (5th generation, 5G) core network, but only needs to add 5G base stations to cooperate with existing 4-th generation (4th generation, 4G) base stations to provide a 5G+4G joint access for terminals. A terminal in an EN-DC state simultaneously accesses a 4G cell and a 5G cell, where the 4G cell may be called a master cell group (master cell group, MCG), and the 5G cell may be called a secondary cell group (secondary cell group, SCG).

At present, some terminals may support dual subscriber identification module (subscriber identification module, SIM) cards, so that services from different networks, such as voice, multimedia messaging, short message, and data services, can be implemented. One SIM card of the dual SIM cards can be used as a primary card, and the other SIM card can be used as a secondary card. The primary card refers to a default data service card, which means that the data service for the terminal is transmitted by default through a network corresponding to the primary card. When the primary card is in an EN-DC state, due to an implementation scheme of the terminal, the primary card releases the SCG when the secondary card is executing a related service (such as a voice service or a multimedia messaging service). After the primary card releases the SCG, a network side needs to initiate an SCG addition process to enable the primary card to re-access a 5G cell. If the network side does not initiate the SCG addition process for a long time, the primary card may not be able to access a 5G cell for a long time, thereby affecting network experience of a user.

SUMMARY

Embodiments of this application provide a network access method and a terminal. The terminal can actively initiate RRC connection re-establishment to trigger a network side to add a secondary cell for the terminal, thereby improving network experience of a user.

According to a first aspect, an embodiment of this application provides a network access method, which may be applied to a terminal configured with two SIM cards, where one of the two SIM cards is used as a primary card, and the other one is used as a secondary card. The terminal is connected to primary access network equipment and secondary access network equipment through the primary card, and the terminal is connected to the secondary access network equipment with assistance of the primary access network equipment. The method includes: disconnecting, by the terminal, an RRC connection between the terminal and the secondary access network equipment when the terminal executes a first service through the secondary card; determining, by the terminal, that the first service ends; and actively disconnecting, by the terminal, an RRC connection between the terminal and the primary access network equipment, and sending an RRC connection re-establishment request to the primary access network equipment, so that the terminal is reconnected to the secondary access network equipment through the primary card with assistance of the primary access network equipment.

In other words, in the network access method provided in this embodiment of the specification, in a case that a connection between the primary card of the terminal and the auxiliary access network equipment is disconnected because the secondary card executes a service, when or after the service executed by the secondary card ends, the terminal can actively disconnect the connection between the primary card and the primary access network equipment, and send a connection re-establishment request to the primary access network equipment through the primary card, which may trigger the primary access network equipment to assist the terminal as soon as possible to connect to the secondary access network equipment through the primary card.

In a possible implementation, that the actively disconnecting, by the terminal, an RRC connection between the terminal and the primary access network equipment, and sending an RRC connection re-establishment request to the primary access network equipment includes: when a cell on which the terminal camps through the primary card at the end of the first service supports dual connectivity, actively disconnecting, by the terminal, the RRC connection between the terminal and the primary access network equipment, and sending the RRC connection re-establishment request to the primary access network equipment.

In other words, in this implementation, the terminal disconnects the connection between the terminal and the primary access network equipment only when the cell on which the terminal camps through the primary card supports dual connectivity. It can be understood that in a case that the cell does not support dual connectivity, it is difficult for the terminal to connect to the secondary access network equipment through the primary card. Therefore, in this implementation, in a case that the cell does not support dual connectivity, the connection between the terminal and the primary access network equipment is no longer disconnected, so as to improve communication experience of a user.

In a possible implementation, the dual connectivity is universal terrestrial radio access network—new radio dual connectivity EN-DC.

In a possible implementation, that the actively disconnecting, by the terminal, an RRC connection between the terminal and the primary access network equipment, and sending an RRC connection re-establishment request to the primary access network equipment includes: when the terminal does not receive a measurement control message of an event $B_1$ or an RRC connection reconfiguration request through the primary card within a first time period, actively disconnecting, by the terminal, the RRC connection between the terminal and the primary access network equipment, and sending the RRC connection re-establishment request to the primary access network equipment, where the first time period is a time period that starts when the first service ends.

In other words, in this implementation, after the service executed by the secondary card ends, the terminal may first wait for the measurement control message of the event $B_1$ or the RRC connection reconfiguration request sent by a network side. If no measurement control message of the event $B_1$ or RRC connection reconfiguration request is received from the network side within a specified time period, the terminal actively disconnects the RRC connection between the terminal and the primary access network equipment, and sends the RRC connection re-establishment request to the primary access network equipment, thereby avoiding to miss the measurement control message of the event $B_1$ or the RRC connection reconfiguration request normally sent by the network side.

In a possible implementation, that the actively disconnecting, by the terminal, an RRC connection between the terminal and the primary access network equipment, and sending an RRC connection re-establishment request to the primary access network equipment includes: when a total number of times that the terminal executes service(s) in at least one service through the secondary card within a second time period is less than or equal to n, actively disconnecting, by the terminal, the RRC connection between the terminal and the primary access network equipment, and sending the RRC connection re-establishment request to the primary access network equipment, where the second time period is a time period that terminates when the first service ends, and the first service is one of the at least one service.

In other words, in this implementation, when the total number of times that the secondary card executes service(s) within a period of time, that may cause the primary card to release a secondary cell, does not exceed a preset number of times, the terminal sends the RRC connection re-establishment request to the primary access network equipment, thereby avoiding abnormal statistics data on the network side caused by frequent sending of the RRC connection re-establishment request to the primary access network equipment.

In a possible implementation, the at least one service includes at least one of the following:

a voice service corresponding to the secondary card and a multimedia messaging service corresponding to the secondary card.

In a possible implementation, that the actively disconnecting, by the terminal, an RRC connection between the terminal and the primary access network equipment, and sending an RRC connection re-establishment request to the primary access network equipment includes: when the terminal runs no delay-sensitive application, actively disconnecting, by the terminal, the RRC connection between the terminal and the primary access network equipment, and sending the RRC connection re-establishment request to the primary access network equipment; or when the terminal executes no delay-sensitive service, actively disconnecting, by the terminal, the RRC connection between the terminal and the primary access network equipment, and sending the RRC connection re-establishment request to the primary access network equipment.

In other words, in this implementation, the connection between the terminal and the primary access network equipment is disconnected only when it is determined that the terminal runs no delay-sensitive application or that the terminal executes no delay-sensitive service, to avoid the impact of disconnecting the connection between the terminal and the primary access network equipment on the delay-sensitive application or the delay-sensitive service.

In a possible implementation, after the actively disconnecting, by the terminal, an RRC connection between the terminal and the primary access network equipment, and sending an RRC connection re-establishment request to the primary access network equipment, the method further includes: listing by the terminal, a cell on which the terminal currently camps through the primary card into a first list when the terminal fails to connect to the secondary access network equipment through the primary card, where when the terminal camps on a cell in the first list through the primary card, the terminal no longer sends an RRC connection re-establishment request to the primary access network equipment.

In other words, in this implementation, a cell in which the terminal fails to access the secondary access network equipment through the primary card may be listed into a blacklist. When the terminal camps on a cell in the blacklist through the primary card, the terminal no longer sends an RRC connection re-establishment request to the primary access network equipment, so as to avoid repeated initiation of RRC connection re-establishment caused by repeated failures of access to the secondary access network equipment.

In a possible implementation, the method further includes: clearing, by the terminal, the first list when the terminal restarts, or when a tracking area of a wireless network accessed by the terminal through the primary card changes.

In a possible implementation, the primary access network equipment is 4G access network equipment, and the secondary access network equipment is 5G access network equipment.

In other words, in this implementation, in a case that a 5G cell accessed by the primary card of the terminal is released because the secondary card executes a service, when or after the service executed by the secondary card ends, the terminal can actively release a 4G cell accessed by the primary card, and send a connection re-establishment request to the 4G primary access network equipment through the primary card, which may trigger the primary access network equipment to assist the terminal as soon as possible to connect to a 5G cell by using the primary card, thereby improving communication experience of a user.

According to a second aspect, an embodiment of this application provides a terminal configured with two SIM cards, where one of the two SIM cards is used as a primary card, and the other one is used as a secondary card. The terminal is connected to primary access network equipment and secondary access network equipment through the primary card, and the terminal is connected to the secondary access network equipment with assistance of the primary access network equipment. The terminal includes a processor, a memory, and a transceiver. The memory is configured to store a computer instruction; and when the terminal operates, the processor executes the computer instruction so that the terminal performs: disconnecting, by the terminal, an RRC connection between the terminal and the secondary access network equipment when the terminal executes a first service through the secondary card; determining, by the terminal, that the first service ends; and the terminal actively disconnects an RRC connection between the terminal and the primary access network equipment, and sending an RRC connection re-establishment request to the primary access network equipment, so that the terminal is reconnected to the secondary access network equipment through the primary card with assistance of the primary access network equipment.

In a possible implementation, the processor executes the computer instruction, so that the terminal further performs: when a first cell on which the terminal camps through the primary card at the end of the first service supports dual connectivity, actively disconnecting, by the terminal, the RRC connection between the terminal and the primary access network equipment, and sending the RRC connection re-establishment request to the primary access network equipment.

In a possible implementation, the dual connectivity is universal terrestrial radio access network—new radio dual connectivity EN-DC.

In a possible implementation, the processor executes the computer instruction, so that the terminal further performs: when the terminal does not receive a measurement control message of an event $B_1$ or an RRC connection reconfiguration request through the primary card within a first time period, actively disconnecting, by the terminal, the RRC connection between the terminal and the primary access network equipment, and sending the RRC connection re-establishment request to the primary access network equipment, where the first time period is a time period that starts when the first service ends.

In a possible implementation, the processor executes the computer instruction, so that the terminal further performs: when a total number of times that the terminal executes service(s) in at least one service through the secondary card within a second time period is less than or equal to n, actively disconnecting, by the terminal, the RRC connection between the terminal and the primary access network equipment, and sending the RRC connection re-establishment request to the primary access network equipment, where the second time period is a time period that terminates when the first service ends, and the first service is one of the at least one service.

In a possible implementation, the at least one service includes at least one of the following:

a voice service corresponding to the secondary card and a multimedia messaging service corresponding to the secondary card.

In a possible implementation, the processor executes the computer instruction, so that the terminal further performs: when the terminal runs no delay-sensitive application, actively disconnecting, by the terminal, the RRC connection between the terminal and the primary access network equipment, and sending the RRC connection re-establishment request to the primary access network equipment; or when the terminal executes no delay-sensitive service, actively disconnecting, by the terminal, the RRC connection between the terminal and the primary access network equipment, and sending the RRC connection re-establishment request to the primary access network equipment.

In a possible implementation, after the actively disconnecting, by the terminal, an RRC connection between the terminal and the primary access network equipment, and sending an RRC connection re-establishment request to the primary access network equipment, the processor executes the computer instruction, so that the terminal further performs: listing, by the terminal, a cell on which the terminal currently camps through the primary card into a first list when the terminal fails to connect to the secondary access network equipment through the primary card, where when the terminal camps on a cell in the first list through the primary card, the terminal no longer sends an RRC connection re-establishment request to the primary access network equipment.

In a possible implementation, the processor executes the computer instruction, so that the terminal further performs: clearing, by the terminal, the first list when the terminal restarts, or when a tracking area of a wireless network accessed by the terminal through the primary card changes.

In a possible implementation, the primary access network equipment is 4G access network equipment, and the secondary access network equipment is 5G access network equipment.

It can be understood that the terminal provided in the second aspect is configured to perform the method provided in the first aspect. Therefore, for beneficial effects that can be achieved by the terminal, reference may be made to the foregoing corresponding beneficial effects.

According to a third aspect, an embodiment of this application provides a chip system, including a processor and an interface circuit; where the processor is connected to the interface circuit, and is configured to execute instructions so that a terminal installed with the chip system performs the method provided in the first aspect.

According to a fourth aspect, an embodiment of this application provides a computer storage medium. The computer storage medium includes computer instructions, and when the computer instructions are run on a terminal, the terminal is caused to perform the method provided in the first aspect.

According to a fifth aspect, an embodiment of this application provides a computer program product. When computer program code contained in the computer program product is executed by a processor in a terminal, the method provided in the first aspect is implemented.

In the network access method and the terminal provided in the embodiments of this application, the terminal configured with dual cards can actively disconnect the RRC connection between the primary card and the network side when a service of the secondary card ends, and send an RRC connection re-establishment request through the primary card, which may trigger the network side to add a secondary cell for the primary card of the terminal as soon as possible, thereby improving network experience of a user.

BRIEF DESCRIPTION OF THE DRAWINGS

FIGS. 4C-1 and 4C-2 are a flowchart of a network access method according to an embodiment of this application;

DETAILED DESCRIPTION OF ILLUSTRATIVE EMBODIMENTS

Figure 1:
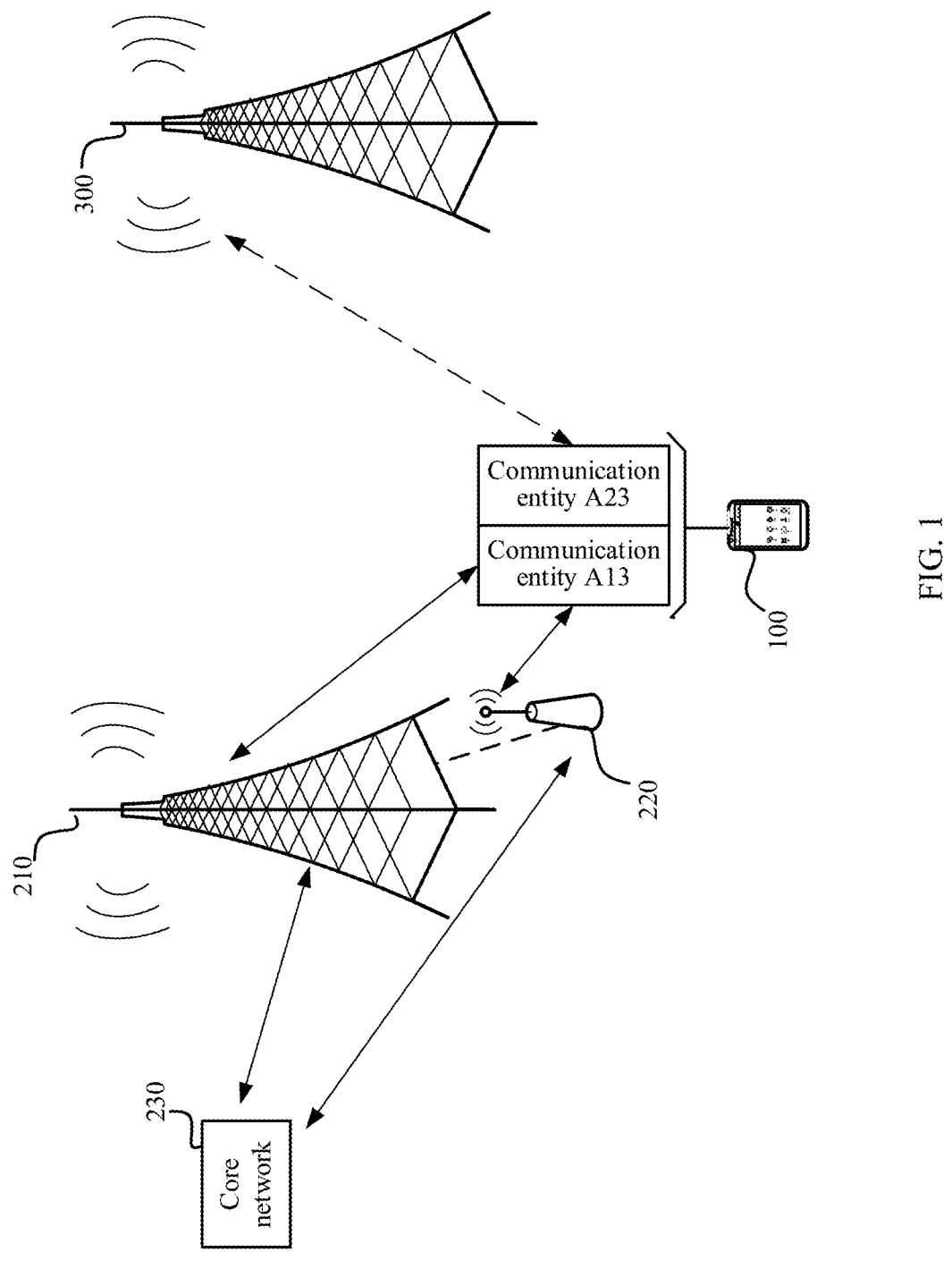
FIG. 1 is a schematic diagram of a network system to which embodiments of this application are applicable.

The following describes technical solutions in embodiments of the present invention with reference to accompanying drawings. Apparently, the described embodiments are merely a part rather than all of the embodiments of this specification.

"One embodiment" or "some embodiments" or the like in description of this specification means that a particular feature, structure, or characteristic described in combination with the embodiment is included in one or more embodiments of this specification. Therefore, expressions such as "in an embodiment", "in some embodiments", "in some other embodiments", and "in some different embodiments" appearing in different places in this specification do not necessarily indicate reference to a same embodiment, but mean "one or more but not all embodiments", unless otherwise specified in another way.

In the description of this specification, unless otherwise specified, "/" indicates an "or" relationship. For example, A/B may represent A or B. In this specification, "and/or" is only an association relationship for describing associated objects and represents that three relationships may exist. For example, A and/or B may represent the following three cases: Only A exists, both A and B exist, and only B exists. In addition, in the description of the embodiments of this specification, "a plurality of" means two or more than two.

In the description of this specification, the terms "first" and "second" are merely intended for a purpose of description, and shall not be understood as an indication or implication of relative importance or an implicit indication of the number of the indicated technical features. Therefore, a feature limited by "first" or "second" may explicitly or implicitly include one or more features. The terms "include", "comprise", and "have", and variants thereof all mean "including but not limited to", unless otherwise specifically emphasized.

Before describing the technical solutions provided in the embodiments of this application, a technical background and an application architecture involved in the solutions provided by the embodiments of this application are first described.

The 5-th generation network architecture can be divided into two networking modes: NSA and stand-alone SA. In the early stage of 5G mobile communications system, most operators chose an EN-DC architecture as the NSA networking mode. The EN-DC architecture is a dual connectivity architecture defined by 3GPP. In the EN-DC architecture, a terminal may be connected to 4G access network equipment and to 5G access network equipment with assistance of the 4G access network equipment, thereby achieving simultaneous access to a 4G cell and a 5G cell, so that a user has better communication experience.

Currently, more and more mobile phones support two inserted SIM cards at the same time. For example, one SIM card is used for private services, and the other SIM card is used for work; or one SIM card is used for data services, and the other SIM card is used for voice services. One SIM card of the two SIM cards can be used as a primary card, and the other SIM card can be used as a secondary card. The primary card refers to a default data service card, which means that the data service for the terminal is transmitted by default through a network corresponding to the primary card. When the primary card supports EN-DC, the primary card can simultaneously access a 4G cell and a 5G cell. Due to an implementation scheme of the mobile phone, the primary card releases the 5G cell when the secondary card is executing a related service (such as a voice service or a multimedia messaging service).

At present, a network side triggers a process for the terminal to add an SCG by sending a radio resource control (radio resource control, RRC) connection reconfiguration (connection reconfiguration) request or a measurement control message of an event $B_1$ (event $B_1$). In a dual-card scenario, after a service of the secondary card ends, the network side may not send an RRC connection reconfiguration request or a measurement control message of an event $B_1$ for a long time, so that the primary card cannot reconnect to the 5G network for a long time and a user is unable to fully experience more stable, faster and more reliable network performance of the 5G network, resulting in poor communication experience of the user.

To this end, an embodiment of this application provides a network access method. In a case that a service of the secondary card causes the primary card to release an SCG, when the service of the secondary card ends, the primary card can actively send an RRC connection re-establishment request to the network side to re-establish an RRC connection between the primary card and the network side. This triggers the network side to send an RRC connection reconfiguration request to the primary card to add an SCG for the primary card, so that the primary card can reconnect to the 5G network as soon as possible, improving communication experience of the user.

FIG. 1 is a wireless communications system to which a network access method provided in an embodiment of this application is applicable. The wireless communication system may include: a terminal 100, access network equipment (access network equipment) 210, access network equipment 220, and access network equipment 300. The access network equipment 210 and the access network equipment are connected to a core network 230.

The access network equipment 210 (or the access network equipment 220 or the access network equipment 300) may be a base transceiver station (base transceiver station, BTS) in a time division synchronous code division multiple access (time division synchronous code division multiple access, TD-SCDMA) system, or may be an evolutional node B (evolutional node B, eNB) in an LTE system, or may be a next generation node B (next generation node B, gNB) in a 5G system. In addition, the access network equipment 210 (or the access network equipment 220 or the access network equipment 300) may alternatively be an access point (access point, AP), a transmission and reception node (trans TRP), a central unit (central unit, CU), or an access network entity, and may include some or all of the functions of the foregoing access network entity.

The access network equipment 210 and the access network equipment 220 may be network equipment in the EN-DC architecture. Specifically, the access network equipment 210 may be an eNB, and the access network equipment 220 may be a gNB. The access network equipment 210 and the access network equipment 220 may be connected to a 4G core network (evolved packet core, EPC) 230 together.

The terminals 100 may be distributed in the wireless communications system shown in FIG. 1, and may be stationary or mobile. The terminal 100 may include but is not limited to: a mobile phone (mobile phone), a tablet computer (Pad), a computer having wireless transmitting and receiving functions, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), and the like.

Figure 2:
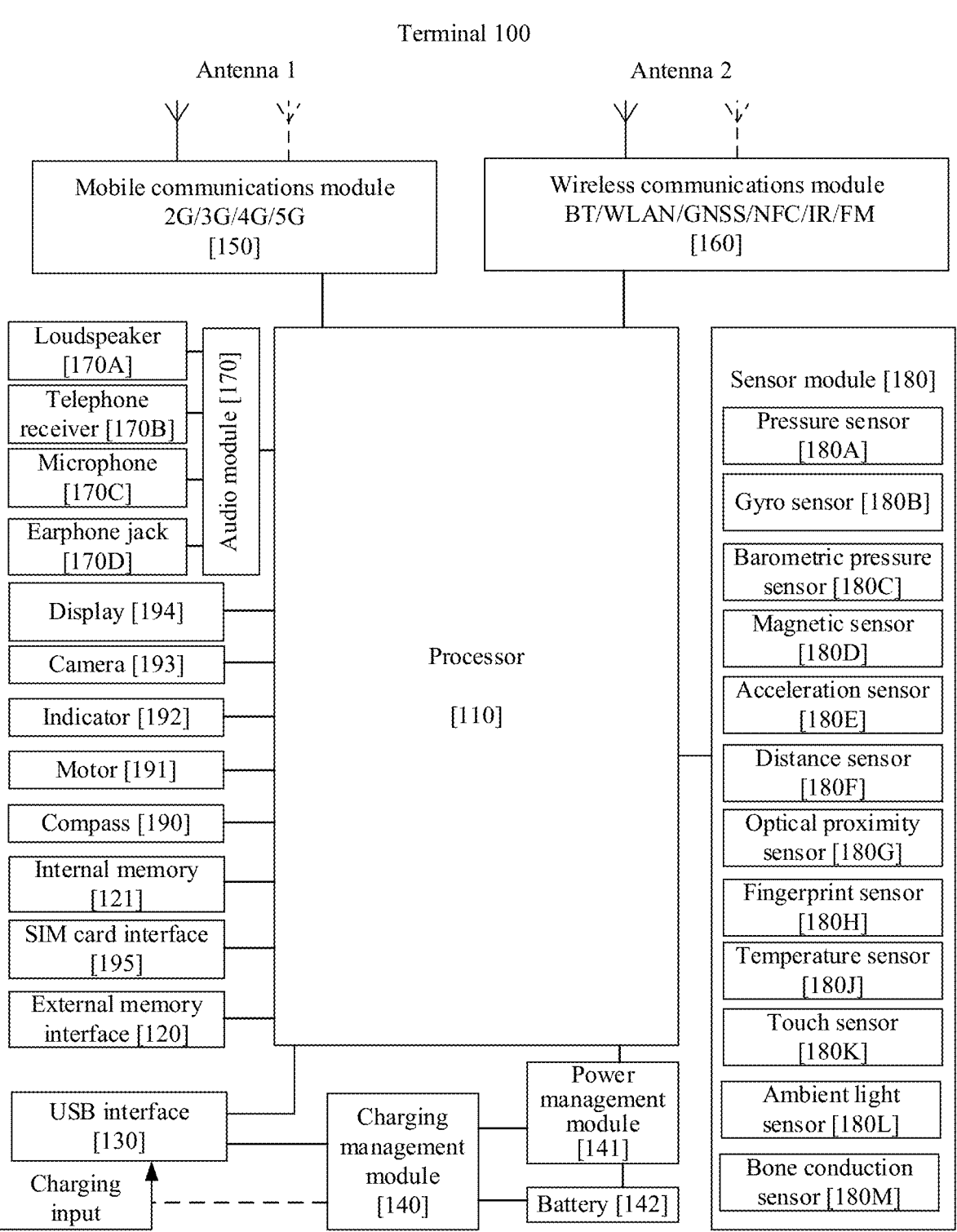
FIG. 2 is a schematic structural diagram of a terminal according to an embodiment of this application.

FIG. 2 is a possible hardware structure of the terminal 100.

The terminal 100 may include a processor no, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a key 190, an engine 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that a structure illustrated in this embodiment of this application does not constitute a specific limitation on the terminal 100. In some other embodiments of this application, the terminal 100 may include more or fewer components than those shown in the figure, or combine some of the components, split some of the components, or arrange the components differently. The components shown in the figure may be implemented by using hardware, software, or a combination of software and hardware.

The processor no may include an application processor (application processor, AP) and a modem (modem).

In some embodiments, the processor no may further include one or more of a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices or be integrated into one or more processors.

A wireless communication function of the terminal 100 may be implemented by using the antenna 1, the antenna 2, the mobile communications module 150, the wireless communications module 160, the modem, the baseband processor, and the like.

The antenna 1 and the antenna 2 are configured to transmit and receive an electromagnetic wave signal. Each antenna of the terminal 100 may be configured to cover one or multiple communication bands. Different antennas may each be used for multiple purposes to improve antenna utilization. For example, the antenna 1 may also be used as a diversity antenna of a wireless local area network. In some other embodiments, the antenna may be used in combination with a tuning switch.

The mobile communications module 150 may provide a wireless communication solution including 2G/3G/4G/5G and the like to be applied to the terminal 100. The mobile communications module 150 may include at least one filter, a switch, a power amplifier, a low noise amplifier (low noise amplifier, LNA), and the like. The mobile communications module 150 may receive an electromagnetic wave through at least two antennas including the antenna 1, perform processing such as filtering and amplification on the received electromagnetic wave, and transmit the processed electromagnetic wave to the modem for demodulation. The mobile communications module 150 may further amplify a signal modulated by the modem, and convert the signal into an electromagnetic wave through the antenna 1 for transmission. In some embodiments, at least some functional modules of the mobile communications module 150 may be provided in the processor 110. In some embodiments, at least some functional modules of the mobile communications module 150 and at least some modules of the processor no may be provided in a same device.

The modem may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal through an audio device (not limited to the loudspeaker 170A, the telephone receiver 170B, and the like), or displays an image or a video through the display 194. In some embodiments, the modem may be a separate device. In some other embodiments, the modem may be separate from the processor 110 and provided in a same device together with the mobile communications module 150 or another functional module. In some other embodiments, the mobile communications module 150 may be a module in the modem.

The wireless communications module 160 may provide wireless communication solutions such as a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), and an infrared technology (infrared, IR) to be applied on the terminal 100. The wireless communications module 160 may be one or more devices integrating at least one communication processing module. The wireless communications module 160 receives an electromagnetic wave through the antenna 2, performs frequency modulation and filtering processing on the electromagnetic wave signal, and transmits the processed signal to the processor no. The wireless communications module 160 may also receive a to-be-transmitted signal from the processor no, perform frequency modulation and amplification on the signal, and transmit the signal as an electromagnetic wave using the antenna 2.

In some embodiments, the antenna 1 of the terminal 100 is coupled to the mobile communications module 150, and the antenna 2 is coupled to the wireless communications module 160, so that the terminal 100 can communicate with a network and another device by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), fifth generation, new radio (new radio, NR), BT, GNSS, WLAN, NFC, FM, an IR technology, and/or the like. The GNSS may include the global positioning system (global positioning system, GPS), the global navigation satellite system (global navigation satellite system, GLONASS), the Beidou navigation satellite system (Beidou navigation satellite system, BDS), the quasi-zenith satellite system (quasi-zenith satellite system, QZSS), and/or the satellite based augmentation systems (satellite based augmentation systems, SBAS).

The SIM card interface 195 is configured to connect a SIM card. The SIM card may be inserted into the SIM card interface 195 or pulled out from the SIM card interface 195, to come into contact with and separate from the terminal 100. The terminal 100 may support N SIM card interfaces, where N is a positive integer greater than 1. The SIM card interface 195 may support a nano SIM card, a micro SIM card, a SIM card, and the like. A plurality of cards may be inserted into one SIM card interface 195 at the same time. The plurality of SIM cards may be of a same type or of different types. The SIM card interface 195 may also be compatible with different types of SIM cards. The SIM card interface 195 may also be compatible with an external memory card. The terminal 100 interacts with a network by using a SIM card, to implement functions such as call and data communication. In some embodiments, the terminal 100 adopts an eSIM, that is, an embedded SIM (embedded-SIM, eSIM) card. The eSIM card may be embedded in the terminal 100 and cannot be separated from the terminal 100.

Still referring to FIG. 1, the terminal 100 may be installed with a SIM card $A_1$ and a SIM card $A_2$, which means that the terminal 100 is configured with dual SIM cards. The SIM card $A_1$ may correspond to an operator $A_{11}$, and the SIM card $A_2$ may correspond to an operator $A_{21}$. For example, the operator $A_{11}$ and the operator $A_{21}$ may be different operators. For example, the operator $A_{11}$ may be China Mobile®, and the operator $A_{21}$ may be China Unicom®. For example, the operator $A_{11}$ and the operator $A_{21}$ may be a same operator. For example, the operator $A_{11}$ and the operator $A_{21}$ are China Unicom®.

For ease of description, in the embodiments of this application, the SIM card and its evolution are collectively referred to as a SIM card. In one example, the SIM card may be an identity card for a global system for mobile communications (global system for mobile communications, GSM) digital mobile phone subscriber. In one example, the SIM card can alternatively be used to store an identification code and a key of a user, and support the GSM system in authenticating the user. In one example, the SIM card may alternatively be a universal subscriber identity module (universal subscriber identity module, USIM), which may also be referred to as an upgraded SIM card, and so on. Details are not further described herein.

The SIM card can be understood as a key for the terminal 100 to access a network. It can be understood that the SIM card has subscription information or a network use right of an operator's subscriber, which represents a subscriber identity. The terminal 100 may access a mobile network by using the subscriber identity represented by the SIM card. For example, the user identity represented by the SIM card may be a subscriber identity (for example, an international mobile subscriber identity (international mobile subscriber identity, IMSI) or a temporary mobile subscriber identity (temporary mobile subscriber identity, TMSI)). In this embodiment of this application, a subscriber identity corresponding to the SIM card $A_1$ may be referred to as a subscriber identity $A_{12}$, and a subscriber identity corresponding to the SIM card $A_2$ may be referred to as a subscriber identity $A_{22}$. The terminal 100 uses a SIM card (for example, the SIM card $A_1$ or the SIM card $A_2$) to access a network, which may also be referred to as the terminal 100 accessing the network by using a subscriber identity (the subscriber identity $A_{12}$ or the subscriber identity $A_{22}$). The terminal 100 accessing the network by using a subscriber identity means the terminal accessing the network by using the subscription information or the network use right corresponding to the subscriber identity.

From the perspective of the network side, the SIM card (for example, the SIM card $A_1$ and the SIM card $A_2$) logically corresponds to a communication entity served by the network side, for example, user equipment (user equipment, UE) in a 4G or 5G mobile communications system. The communication entity communicates with the network side by using a subscriber identity corresponding to the SIM card. The SIM card $A_1$ and the SIM card $A_2$ can be recognized or regarded by the network side as two different communication entities, even if the SIM card $A_1$ and the SIM card $A_2$ are installed in a same physical entity (that is, the terminal 100). In other words, when the terminal 100 accesses the network by using different subscriber identities, the network side may recognize or regard the terminal 100 as different communication entities. When the terminal 100 is configured with the SIM card $A_1$ and the SIM card $A_2$, the terminal 100 may include two communication entities corresponding to the SIM card $A_1$ and the SIM card $A_2$, respectively. The communication entity corresponding to the SIM card $A_1$ (the subscriber identity $A_{12}$) may be referred to as a communication entity $A_{13}$, and the communication entity corresponding to the SIM card $A_2$ (the subscriber identity $A_{22}$) may be referred to as a communication entity $A_{23}$. The communication entity $A_{13}$ is an entity in the terminal 100 for executing services by using the subscriber identity $A_{12}$. The terminal 100 communicates with the network side by using the subscriber identity $A_{12}$, which may mean that the communication entity $A_{13}$ communicates with the network side. The communication entity $A_{23}$ is an entity in the terminal 100 for executing services by using the subscriber identity $A_{22}$. The terminal 100 communicates with the network side by using the subscriber identity $A_{22}$, which may mean that the communication entity $A_{23}$ communicates with the network side. In some embodiments, the communication entity $A_{13}$ and the communication entity $A_{23}$ may be functional entities or logical entities in the modem of the terminal 100.

In some embodiments, the terminal 100 may be connected to different access network equipment by using the subscriber identity $A_{12}$ and the subscriber identity $A_{22}$, respectively. In other words, the communication entity $A_{13}$ and the communication entity $A_{23}$ may be connected to different access network equipment. For example, as shown in FIG. 1, the communication entity $A_{13}$ is connected to the access network equipment 210, and the communication entity $A_{23}$ is connected to the access network equipment 300.

In some embodiments, the terminal 100 may be connected to a same access network equipment by using the subscriber identity $A_{12}$ and the subscriber identity $A_{22}$. In other words, the communication entity $A_{13}$ and the communication entity $A_{23}$ may be connected to the same access network equipment. For example, the communication entity $A_{13}$ and the communication entity $A_{23}$ are connected to the access network equipment 210 (not shown).

Figure 3:
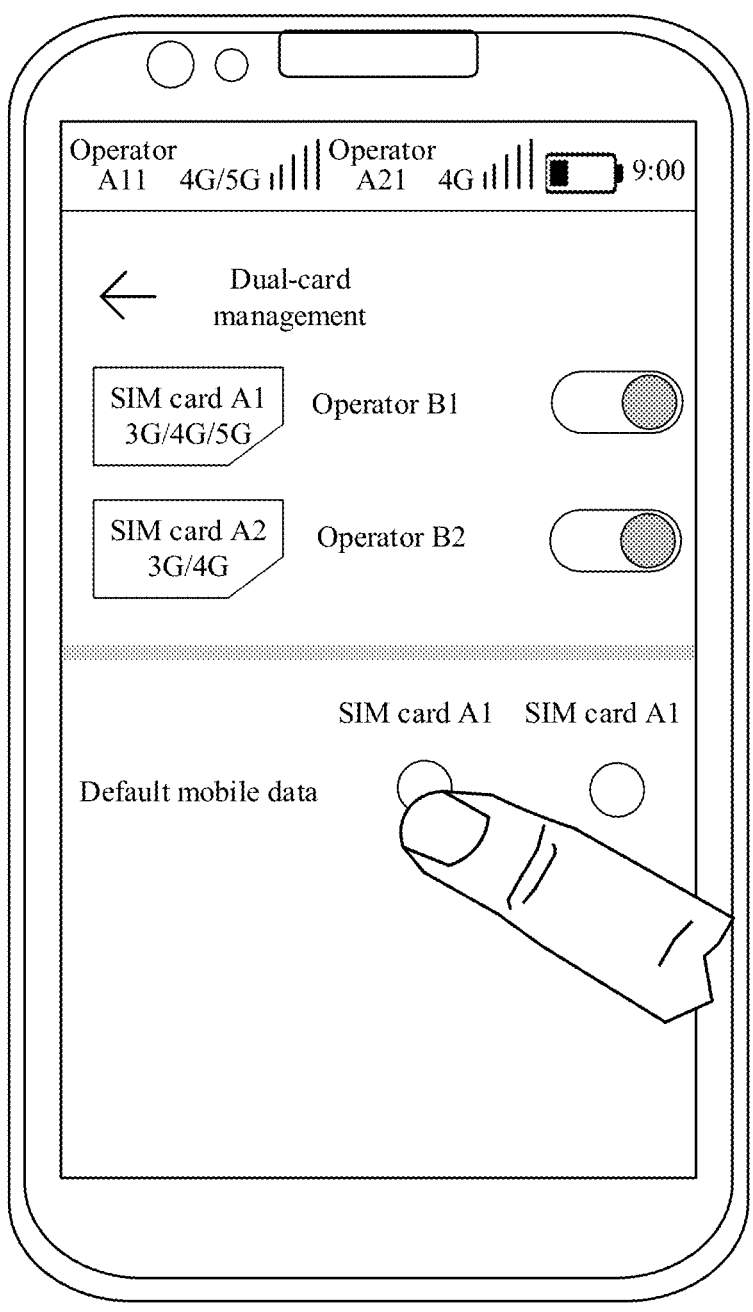
FIG. 3 is a schematic diagram of a user interface according to an embodiment of this application.

In this embodiment of this application, the SIM card $A_1$ can be set as the primary card. For example, the terminal 100 may determine the SIM card $A_1$ as the primary card in response to an operation by the user. In one example, referring to FIG. 3, the terminal 100 may display a dual card management screen, and set the SIM card $A_1$ as the primary card in response of an operation initiated by the user for a functional area corresponding to the SIM card $A_1$. When the SIM card $A_1$ is set as the primary card, the SIM card $A_2$ may be referred to as the secondary card, the communication entity $A_{13}$ may be referred to as a primary card modem, and the communication entity $A_{23}$ may be referred to as a secondary card modem.

Next, the network access method provided in the embodiments of this application is illustrated in different embodiments.

Figure 4A:
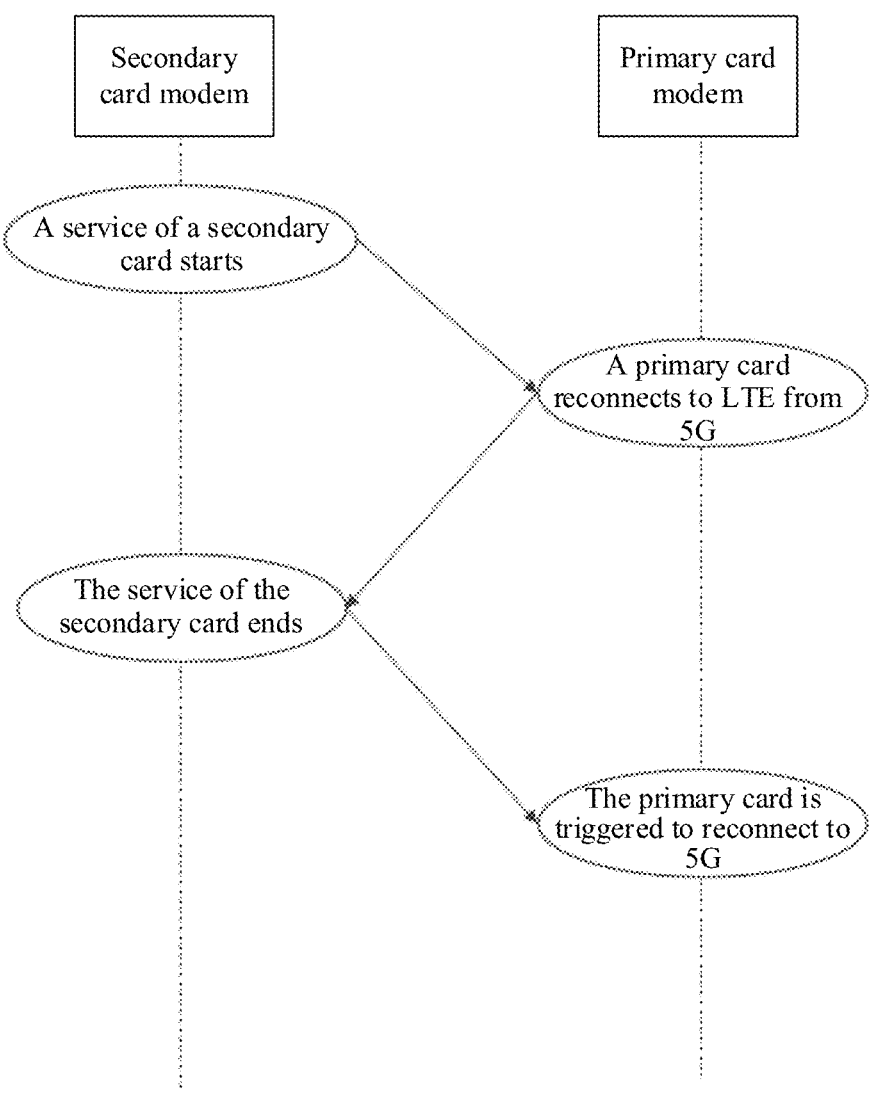
FIG. 4A is a flowchart of a network access method according to an embodiment of this application.

FIG. 4A is a flowchart of a network access method according to some embodiments of this application.

As shown in FIG. 4A, when a service of the secondary card starts, the primary card (or the primary card modem) may be triggered to reconnect to LTE from 5G. In other words, before the service of the secondary card starts, the primary card can simultaneously access a 5G cell and an LTE cell. When the service of the secondary card starts, the primary card can release the 5G cell and maintain access to the LTE cell. For details, reference may be made to description of step 400 to step 406 in FIG. 4C-1 below, and details are not described herein.

When or after the service of the secondary card ends, the primary card can actively trigger a process for reconnecting to 5G. In other word, when or after the service of the secondary card ends, the primary card can actively trigger the network side to add a 5G cell for the primary card, so that the primary card can access the 5G cell as soon as possible, improving communication experience of a user. For details, reference may be made to description of step 407 to step 411 in FIG. 4C-1 and FIG. 4C-2 below, and details are not described herein.

According to the network access method provided in this embodiment of this application, when or after the service of the secondary card ends, a process for the primary card to reconnect to 5G can be actively triggered, so that the primary card can reconnect to a 5G cell as soon as possible, improving communication experience of a user in a dual-card scenario.

Figure 4B:
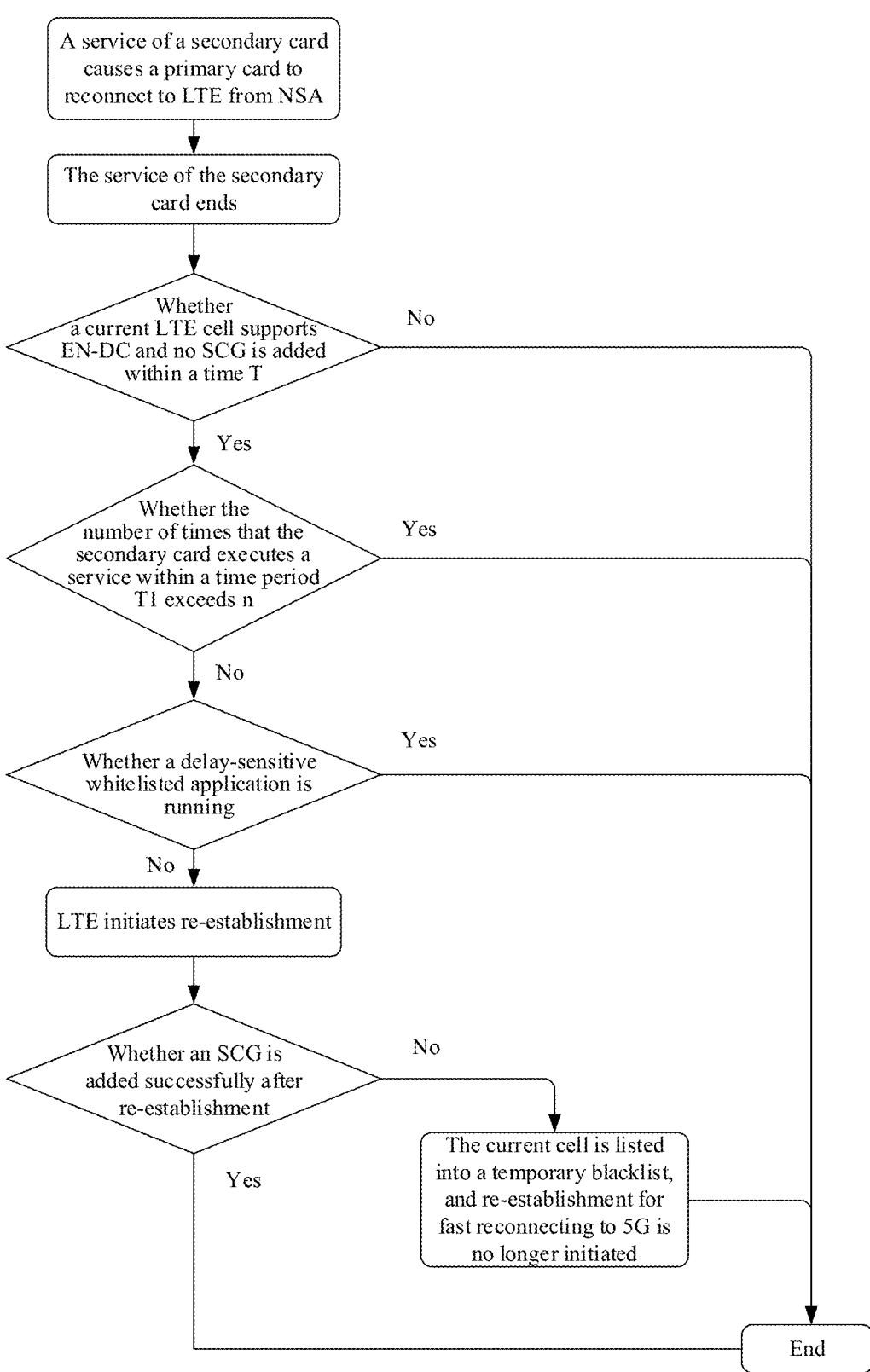
FIG. 4B is a flowchart of a network access method according to an embodiment of this application.

FIG. 4B is a flowchart of a network access method according to some other embodiments of this application.

A service of the secondary card causes the primary card to reconnect to LTE from NSA. In other words, when the service of the secondary card starts, the primary card can release a 5G cell and maintain access to an LTE cell.

When or after the service of the secondary card ends, the terminal may determine whether the current LTE cell for the primary card supports EN-DC and no SCG is added within a time T. No SCG added for the primary card within the time T means that no process for adding an SCG for the primary card is triggered on the network side within the time T.

In other words, the terminal may determine whether the LTE cell on which the primary card currently camps supports EN-DC. For details, reference may be made to description of step 410a in FIG. 4C-2 below.

If the LTE cell on which the primary card currently camps does not support EN-DC, the terminal no longer performs subsequent steps.

If the LTE cell on which the primary card currently camps supports EN-DC, the terminal may determine whether a process for adding an SCG for the primary card is triggered by the network side within the time period T that starts when the service of the secondary card ends. For details, reference may be made to description of step 410b in FIG. 4C-2 below.

If no process for adding an SCG for the primary card is triggered on the network side within the time period T, the terminal may determine whether a number of times that the secondary card executes a service within a time period $T_1$ exceeds n. For details, reference may be made to description of step 410c in FIG. 4C-2 below, and details are not described herein.

If the number of times that the secondary card executes the service within the time $T_1$ exceeds n, the terminal no longer executes subsequent steps.

If the number of times that the secondary card executes the service within the time $T_1$ does not exceed n, the terminal may determine whether a delay-sensitive whitelisted application is running. For details, reference may be made to description of step 410d in FIG. 4C-2 below, and details are not described herein.

If a delay-sensitive whitelisted application is running, the terminal no longer executes subsequent steps.

If no delay-sensitive whitelisted application is running, the terminal can actively trigger the LTE used by the primary card to initiate re-establishment. For details, reference may be made to description of step 411 to step 414 in FIG. 4C-2 below, and details are not described herein.

The terminal may determine whether an SCG is successfully added for the primary card after re-establishment. For details, reference may be made to description of step 415 in FIG. 4C-2 below, and details are not described herein.

If no SCG is successfully added, the terminal lists a current cell for the primary card (that is, the cell on which the primary card currently camps) into a temporary blacklist, and no longer initiates re-establishment for fast reconnecting to 5G. For details, reference may be made to description of step 416 in FIG. 4C-2 above, and details are not described here.

According to the network access method provided in this embodiment of this application, when or after the service of the secondary card ends, a process for the primary card to reconnect to 5G can be actively triggered, so that the primary card can reconnect to a 5G cell as soon as possible, improving communication experience of a user in a dual-card scenario.

Figures 1, 4C:
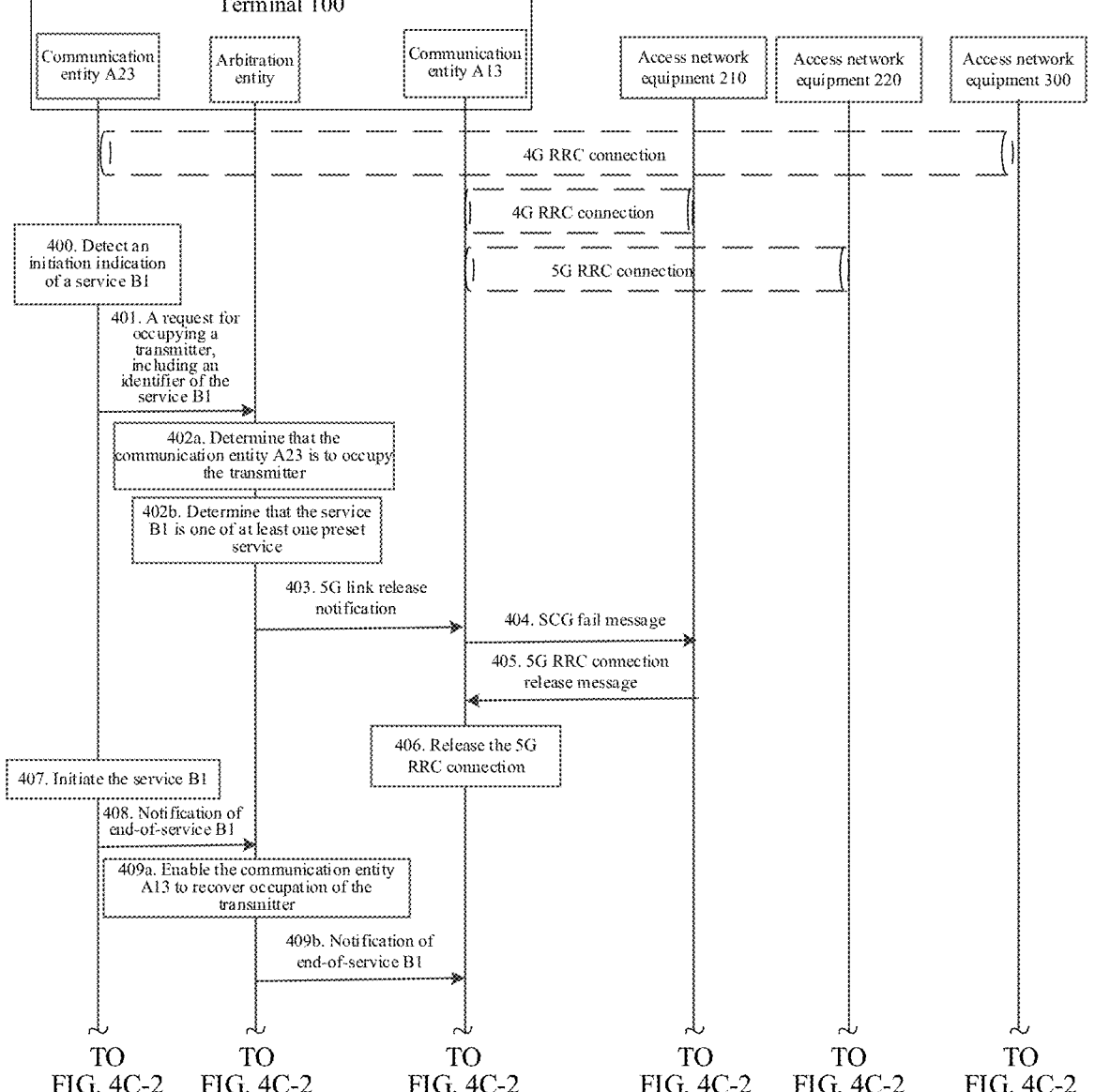

Next, with reference to FIGS. 4C-1 and 4C-2, solutions in the embodiments of this application are described by using an example in which the communication entity $A_{13}$ is in an EN-DC state with the access network equipment 210 as a master node, the communication entity $A_{23}$ is connected to the access network equipment 300, and the access network equipment 300 is a 4G base station.

Referring to FIGS. 4C-1 and 4C-2, when the communication entity $A_{13}$ is in the EN-DC state with the access network equipment 210 as the master node, there are a 4G RRC connection between the communication entity $A_{13}$ and the access network equipment 210 and a 5G RRC connection between the communication entity 13 and the access network equipment 220. There is a 4G RRC connection between the communication entity 23 and the access network equipment 200. As described above, the communication entity $A_{13}$ is the primary card modem, which means that a data service of the terminal 100 (for example, a data service of a third-party application run by the terminal 100) is transmitted by default through a link between the communication entity 13 and the network side. The user can experience 5G performance when the communication entity $A_{13}$ is in the EN-DC state. For example, referring to FIG. 5A, the communication entity $A_{13}$ is in the EN-DC state and a status bar of the terminal 100 may display a 4G/5G dual-network icon 501 corresponding to the SIM card $A_1$. The terminal 100 can smoothly play a high-definition video online.

Referring to FIG. 4C-1, the communication entity $A_{23}$ may perform step 400 to initiate a service $B_1$.

For example, the service $B_1$ is a voice service that needs to be executed by using the subscriber identity $A_{22}$. For example, referring to FIG. 5B, the terminal 100 may exit a video play screen in response to an operation by the user and display a dial screen. In the dial screen, the user can input a desired phone number and then select the SIM card $A_2$ to dial. In response to the user-initiated operation of making a call, the communication entity $A_{23}$ may initiate a voice service (the service $B_1$).

Still referring to FIG. 4C-1, when the communication entity $A_{23}$ initiates the service $B_1$, the communication entity $A_{23}$ may also perform step 401 to transfer a request for occupying a transmitter to an arbitration entity, where the request for occupying the transmitter includes an identifier of the service $B_1$. In response to the request for occupying the transmitter, the arbitration entity may perform step 402a to determine that the communication entity $A_{23}$ occupies the transmitter, which enables the communication entity $A_{23}$ to execute the service $B_1$. For example, when the service $B_1$ is a voice service, the communication entity $A_{23}$ can dial up and perform a call after the call is connected.

For a purpose of saving power consumption and costs, the terminal 100 is usually equipped with a transmitter. The communication entity $A_{13}$ and the communication entity $A_{23}$ take turns to occupy the transmitter in time division multiplexing (time division multiplexing, TDM) mode. The terminal 100 may further include an arbitration entity. For example, the arbitration entity may be a functional entity or a logical entity in a modem of the terminal 100. The arbitration entity may decide which one of the communication entity $A_{13}$ and the communication entity $A_{23}$ is to occupy the transmitter. In a case that the SIM card $A_1$ is the primary card, the arbitration entity decides that the transmitter is to be occupied by the communication entity $A_{13}$ by default. When the terminal 100 needs to execute the service $B_1$, the communication entity $A_{13}$ applies to the arbitration entity for occupying the transmitter.

The arbitration entity may also perform step 402b to determine that the service $B_1$ is one of at least one preset service. The at least one service may include a service with a long duration or a large amount of service data, such as a voice service or a multimedia messaging service. A short message service has a small amount of data and takes a short time for sending or receiving a short message. Therefore, the short message service is not a service in the at least one service. When a service executed by using the subscriber identity $A_{22}$ is one of the at least one service, the terminal 100 needs to fall back from an EN-DC state under the subscriber identity $A_{13}$ to an LTE state under the subscriber identity $A_{12}$. In other words, the terminal 100 needs to disconnect a 5G RRC connection between the communication entity $A_{13}$ and the access network equipment 220, and only maintain a 4G RRC connection between the communication entity $A_{13}$ and the access network equipment 210. Specifically, when the arbitration entity determines, through step 402b, that the service $B_1$ is one of the at least one service, the arbitration entity may perform step 403 to send a 5G link release notification to the communication entity $A_{13}$. In response to the 5G link release notification, the communication entity $A_{13}$ may perform step 404 to send an SCG fail (SCG fail) message to the access network equipment 210. In response to the SCG failure message, the access network equipment 210 may perform step 405 to send a 5G RRC connection release (RRC connection release) message to the communication entity $A_{13}$. In response to the 5G RRC connection release message, the communication entity $A_{13}$ may perform step 406 to release the 5G RRC connection.

Figures 5A, 5B, 5C:
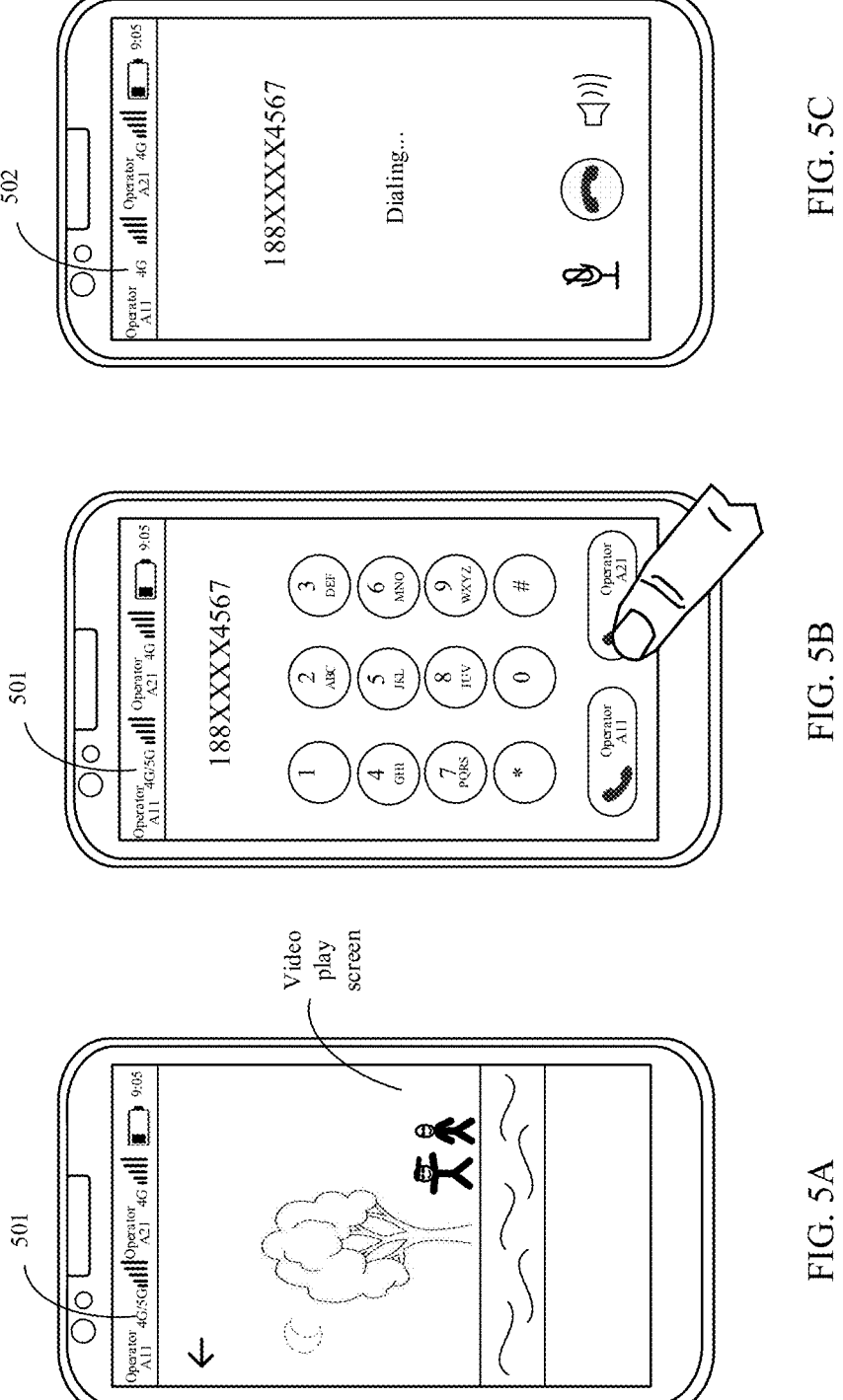
FIG. 5A is a schematic diagram of a user interface according to an embodiment of this application.
FIG. 5B is a schematic diagram of a user interface according to an embodiment of this application.
FIG. 5C is a schematic diagram of a user interface according to an embodiment of this application.

As can be learned from the foregoing description, when the communication entity $A_{23}$ executes the service $B_1$, and the service $B_1$ is one of the at least one preset service, the 5G RRC connection between the communication entity $A_{13}$ and the access network equipment 220 is released, which means that the secondary cell of the communication entity $A_{13}$ is released. The communication entity $A_{13}$ only maintains the 4G RRC connection between the communication entity $A_{13}$ and the access network equipment 210. As shown in FIG. 5C and FIG. 5D, the service $B_1$ can be set as a voice service. During dial-up for the voice service and during a call after the call is connected, the status bar of the terminal 100 may display a 4G network icon 502 corresponding to the SIM card $A_1$.

Still referring to FIG. 4C-1, the communication entity $A_{23}$ may perform step 407 to end the service $B_1$. For example, referring to FIG. 5D, the service $B_1$ is for example a voice service. The communication entity $A_{23}$ may end the service $B_1$ in response to a hang-up operation initiated by the user.

When the communication entity $A_{23}$ ends the service $B_1$, step 408 may further be performed to transfer a notification of end-of-service $B_1$ to the arbitration entity. In response to the notification of end-of-service $B_1$, the arbitration entity may perform step 409a to enable the communication entity $A_{13}$ to recover occupation of the transmitter. In other words, when the service $B_1$ ends, the transmitter is occupied by the communication entity $A_{13}$ again.

During execution of the service $B_1$ and when the service $B_1$ ends, the communication entity $A_{13}$ may maintains the connection between communication entity $A_{13}$ and the access network equipment 210. To enable the communication entity $A_{13}$ to connect to the access network equipment

220 as soon as possible, when the service $B_1$ ends, the communication entity $A_{13}$ can actively disconnect the connection between the communication entity $A_{13}$ and the access network equipment 210, and initiate RRC connection re-establishment. This triggers the network side to send an RRC connection reconfiguration request to the communication entity $A_{13}$, so that an SCG can be quickly added for the communication entity $A_{13}$. Next, details are described.

In some embodiments, when the arbitration entity receives the notification of end-of-service $B_1$, the arbitration entity may transfer to the communication entity $A_{13}$ a message for indicating that the service $B_1$ ends or a message for indicating the communication entity $A_{13}$ to send an RRC connection re-establishment request, so that the communication entity $A_{13}$ sends an RRC connection re-establishment request to the access network equipment 210.

In an illustrative example, as shown in FIG. 4C-1, when the arbitration entity receives the notification of end-of-service $B_1$, step 409b may be performed to send the notification of end-of-service $B_1$ to the communication entity $A_{13}$. After receiving the notification of end-of-service $B_1$, the communication entity $A_{13}$ may perform subsequent steps such as steps 411 and 412.

In an illustrative example, when the arbitration entity receives the notification of end-of-service $B_1$, the arbitration entity may transfer an RRC connection re-establishment request sending instruction to the communication entity $A_{13}$. After receiving the RRC connection re-establishment request sending instruction, the communication entity $A_{13}$ may perform subsequent steps such as steps 411 and 412.

In some embodiments, when detecting an end-of-service $B_1$ indication, the communication entity $A_{23}$ may transfer to the communication entity $A_{13}$ a message indicating that the service $B_1$ ends or a message for indicating the communication entity $A_{13}$ to send an RRC connection re-establishment request, so that the communication entity $A_{13}$ sends an RRC connection re-establishment request to the access network equipment 210. In one example, the message used to indicate that the service $B_1$ ends may be a notification of end-of-service $B_1$. In one example, the message for indicating the communication entity $A_{13}$ to send an RRC connection re-establishment request may be an RRC connection re-establishment request sending instruction.

It can be understood that before the RRC connection re-establishment request is sent, the established RRC connection needs to be released. Therefore, when or after the communication entity $A_{13}$ receives a message indicating that the service $B_1$ ends or a message for indicating the communication entity $A_{13}$ to send an RRC connection re-establishment request, the communication entity $A_{13}$ may first perform step 411, to actively release the 4G RRC connection between the communication entity $A_{13}$ and the access network equipment 210. It can be understood that, with regard to the release of the RRC connection, generally when the RRC connection release message sent by the network side is received, the RRC connection is released in response to the RRC connection release message. However, in step 411, the communication entity $A_{13}$ can actively release the RRC connection without the RRC connection release message sent from the network side.

After actively releasing the RRC connection, the communication entity $A_{13}$ may perform step 412, to send an RRC connection re-establishment request to the access network equipment 210. Upon receiving the RRC connection re-establishment request, the access network equipment 210 may perform step 413 in response to the RRC connection re-establishment request, to send an RRC connection re-establishment message to the communication entity $A_{13}$. After receiving the RRC connection re-establishment message, the communication entity $A_{13}$ can perform radio resource configuration, set content of the RRC connection re-establishment complete message, and the like. Then, the communication entity $A_{13}$ may perform step 414, to send the RRC connection re-establishment complete message to the access network equipment 210. In this way, through the RRC connection re-establishment procedure, the communication entity $A_{13}$ re-accesses the cell provided by the access network equipment 210, and can trigger the access network equipment 210 to add an SCG for the communication entity $A_{13}$. The process of adding an SCG will be described below with reference to FIG. 7, and is not described in detail here.

In some embodiments, the communication entity $A_{13}$ may perform step 410a before step 411, to determine whether the primary cell on which the communication entity $A_{13}$ currently camps supports EN-DC. For example, it can be understood that 5G spectra are mostly at high band, and a high-band network signal coverage is small. In other words, a 5G signal coverage provided by the access network equipment 220 may be smaller than a 4G signal coverage provided by the access network equipment 210. Therefore, one or more of cells provided by the access network equipment 210 may not support EN-DC due to lack of 5G signal coverage. One or more of cells provided by the access network equipment 210 may either not support EN-DC due to network configuration or other reasons. In other words, not all cells provided by the access network equipment 210 support EN-DC.

In addition, during execution of the service $B_1$ by the communication entity $A_{23}$, the terminal 100 has moved or signal quality of the 4G cell on which the communication entity $A_{13}$ camps has changed, causing the communication entity $A_{13}$ to switch to another 4G cell. In other words, a 4G cell on which the communication entity $A_{13}$ camps when the service $B_1$ executed by the communication entity $A_{23}$ starts may be different from a 4G cell on which the communication entity $A_{13}$ camps when the service $B_1$ executed by the communication entity $A_{23}$ ends. As can be learned from the description in the previous paragraph, the 4G cell on which the communication entity $A_{13}$ camps when the service $B_1$ executed by the communication entity $A_{23}$ ends may not support EN-DC. Therefore, before performing step 411, the communication entity $A_{13}$ may first determine whether the 4G cell on which the communication entity $A_{13}$ currently camps supports EN-DC.

In one illustrative example, the communication entity $A_{13}$ may determine, based on its cell access history, whether the 4G cell on which the communication entity $A_{13}$ currently camps supports EN-DC. Historically, whenever accessing a 4G cell, the communication entity $A_{13}$ can record whether an RRC connection reconfiguration request sent by an access network equipment to which the 4G cell belongs is received during attachment to the 4G cell. If an RRC connection reconfiguration request is received, it means that the 4G cell supports EN-DC. If no RRC connection reconfiguration request is received, it means that the 4G cell does not support EN-DC. In this way, the communication entity $A_{13}$ may determine whether the cell on which the communication entity $A_{13}$ currently camps supports EN-DC.

For example, when the cell on which the communication entity $A_{13}$ currently camps supports EN-DC, the communication entity $A_{13}$ may perform step 411 and subsequent steps.

In some embodiments, the communication entity $A_{13}$ performs step 410b before step 411, to determine whether the communication entity $A_{13}$ has received an SCG addition trigger message from the network side when a timer $C_1$ expires. The SCG addition trigger message may specifically be a measurement control message of an event $B_1$ or an RRC connection reconfiguration request. It can be understood that when the service $B_1$ ends, or within a relatively short time after the service $B_1$ ends, the network side may also actively send the measurement control message of the event $B_1$ or the RRC connection reconfiguration request to the communication entity $A_{13}$, to trigger a process for adding an SCG for the communication entity $A_{13}$. In order to avoid the measurement control message of the event $B_1$ or the RRC connection reconfiguration request actively sent by the network side, the communication entity $A_{13}$ performs step 410b before step 411.

In an illustrative example, duration of the timer $C_1$ may be determined by using big data about duration in which the primary card reconnects to the 5G network. The duration in which the primary card reconnects to 5G may be duration between a moment at which a service performed by the secondary card (the service causes the primary card to release an SCG) ends and a moment at which the primary card re-accesses the 5G network, in a dual-card scenario. Through statistics or survey of duration in which primary cards of existing terminals reconnect to 5G, the big data about the duration in which the primary card reconnects to the 5G network is obtained. Distribution of each duration in the big data about the duration in which the primary card reconnects to 5G can be calculated. Duration of the timer $C_1$ can be determined based on distribution of each duration in the big data about the duration in which the primary card reconnects to 5G. For example, duration with a greatest probability is set to be the duration of the timer $C_1$.

In an illustrative example, the duration of the timer $C_1$ can be preset based on experience or experiments, for example, may be a duration of 2s.

For example, during timing of the timer $C_1$, if the communication entity $A_{13}$ has not received a measurement control message of an event $B_1$ or an RRC connection reconfiguration request, the communication entity $A_{13}$ may perform step 411 and subsequent steps.

In some embodiments, the communication entity $A_{13}$ may perform step 410c before step 411, to determine whether a total number of times that the communication module $A_{23}$ executes service(s) in at least one service within a time period $T_1$ exceeds n. The time period $T_1$ may be a time period counted backward from a time at which the communication entity $A_{13}$ receives a message indicating that the service $B_1$ ends or a message for indicating the communication entity $A_{13}$ to send an RRC connection re-establishment request. For example, if a time length of the time period $T_1$ is 60 seconds, the time period $T_1$ is 60 seconds counted backward with a moment, at which the communication entity $A_{13}$ receives a message indicating that the service $B_1$ ends or a message for indicating the communication entity $A_{13}$ to send an RRC connection re-establishment request, as an end point. In other examples, a time length of the time period $T_1$ may be 120 seconds, 180 seconds, or the like. n is a preset value, which may be, for example, 3 or 4.

A total number of times that service(s) in at least one service are executed in step 410c is to accumulate the number of times that the service(s) in the at least one service are executed. For example, the at least one service includes a voice service and a multimedia messaging service. If the voice service is executed once and the multimedia messaging service is executed twice, the total number of times that the service(s) in the at least one service are executed is 3 (1+2).

It can be understood that, according to logic of the network access method provided in the embodiments of this application, the communication entity $A_{13}$ triggers the RRC connection re-establishment when or after the service(s), in the at least one service, executed by the communication entity $A_{23}$ ends. If the number of times that the communication entity $A_{23}$ executes service(s) in the at least one service in a short time is large, the RRC connection re-establishment occurs frequently, which may lead to abnormal statistics on the network side. To avoid this, the communication entity $A_{13}$ performs step 410c before step 411. If the number of times that the communication entity $A_{23}$ executes service(s) in the at least one service in a short time is not excessive (not more than n, where n is a natural number), the RRC connection re-establishment may be triggered. For example, n may be 3, 4, or the like herein. In a specific implementation, a value of n may be preset based on experience or experiments.

In some embodiments, the communication entity $A_{13}$ may perform step 410d before step 411, to determine whether the terminal 100 is currently running a delay-sensitive application. Because the SIM card $A_1$ is a default data service card, service data of applications running on the terminal 100 is transmitted through a connection between the communication entity $A_{13}$ and the network side. To trigger the RRC connection re-establishment, the communication entity $A_{13}$ needs to disconnect its connection from the network side, that is, to perform step 411. If the communication entity $A_{13}$ needs to disconnect its connection from the network side when the terminal 100 is currently running a delay-sensitive application, operating experience of the user with the application is affected. Therefore, the communication entity $A_{13}$ may perform step 410d before step 411.

In some embodiments, the delay-sensitive application may be an application in a whitelist of delay-sensitive applications. The whitelist of delay-sensitive applications may include application identifiers of a plurality of applications. An application identifier may be a package name (package name) of an application.

In some embodiments, the whitelist of delay-sensitive applications may be used as a configuration file, and is pre-configured into the terminal 100 when the terminal 100 is being produced. Applications in the whitelist of delay-sensitive applications may include interactive game (for example, multiplayer online battle arena (multiplayer online battle arena, MOBA)) applications, telephone applications, and the like.

In an illustrative example, after the terminal 100 is shipped from the factory, the developer can update the applications in the whitelist of delay-sensitive applications, for example, by adding a newly emerging interactive application to the whitelist of delay-sensitive applications. The updated whitelist of delay-sensitive applications may be sent to the terminal 100 by server push.

In some embodiments, a user can add an application to the whitelist of delay-sensitive applications. The terminal 100 may provide an operation portal and an interactive interface for managing the whitelist of delay-sensitive applications, so that the user can add an application to the whitelist of delay-sensitive applications.

In an illustrative example of this embodiment, the terminal 100 may display an operation portal for managing the whitelist of delay-sensitive applications, in response to an operation initiated by the user for a "settings" function option. The terminal 100 may display a screen shown in FIG. 6A in response to an operation for the operation portal. An application $D_1$ and an application $D_2$ are applications that are installed on the terminal 100 and that have already been added to the whitelist of delay-sensitive applications. An application $D_3$, an application $D_4$, and the like are applications that are installed on the terminal 100 but have not added to the whitelist of delay-sensitive applications.

Figures 6A, 6B:
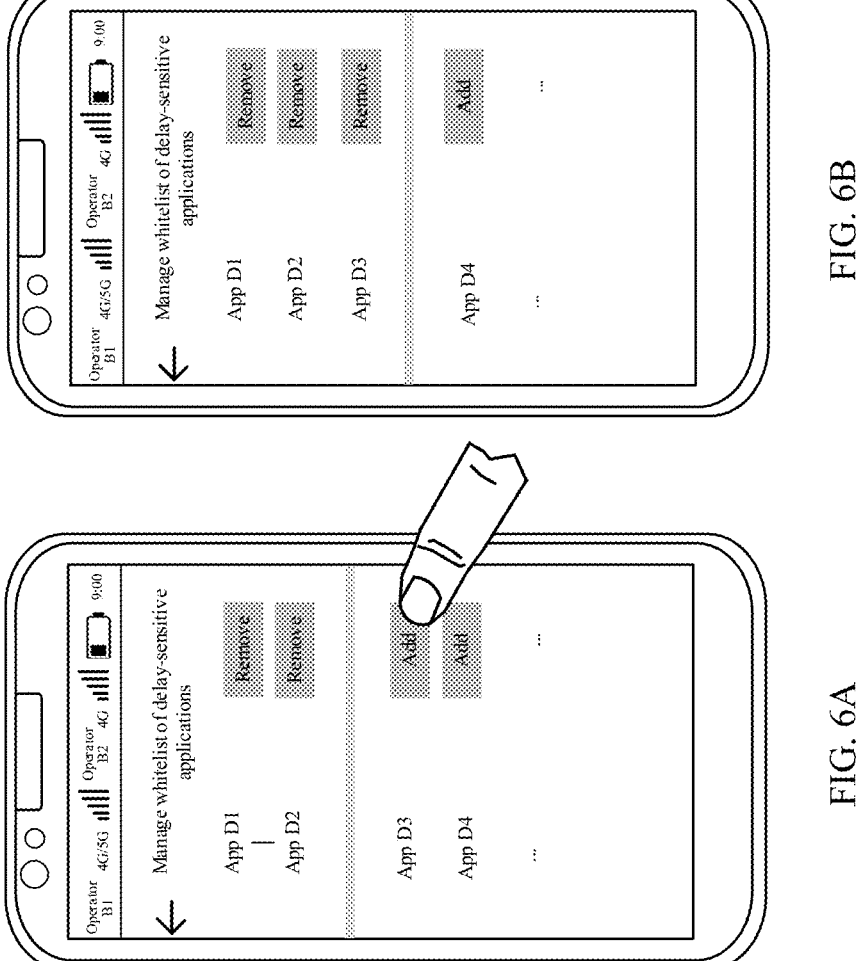
FIG. 6A is a schematic diagram of a user interface according to an embodiment of this application.
FIG. 6B is a schematic diagram of a user interface according to an embodiment of this application.

In addition, as shown in FIG. 6A, for an application that has been added to the whitelist of delay-sensitive applications, the terminal 100 can provide a "remove" option for the user to remove the related application from the whitelist of delay-sensitive applications.

As shown in FIG. 6A, for an application that is not added to the whitelist of delay-sensitive applications, the terminal 100 can provide an "add" option for the user to add the related application to the whitelist of delay-sensitive applications. For example, referring to FIG. 6A and FIG. 6B, the terminal 100 may add the application $D_3$ to the whitelist of delay-sensitive applications in response to an operation on the "add" function option corresponding to the application $D_3$.

When performing step 410d, the communication entity $A_{13}$ may determine whether an application running in the foreground of the terminal 100 is an application in the whitelist of applications. For example, the communication entity $A_{13}$ may obtain a package name of the application running in the foreground, match or search the package name in the whitelist of applications, and determine that the application running in the foreground is an application in the whitelist of applications if a package name consistent with the package name is matched or found. When the application running in the foreground is an application in the whitelist of applications, it is determined that the terminal 100 is running a delay-sensitive application. When the application running in the foreground is not an application in the whitelist of applications, it is determined that the terminal 100 is not running a delay-sensitive application.

When the terminal 100 is not running a delay-sensitive application, step 411 and its subsequent steps can be performed.

In some embodiments, before performing step 411, the communication entity $A_{13}$ may determine whether the terminal 100 currently is executing a delay-sensitive service. A delay-sensitive service may be a voice service, a telemetry service, a teleconferencing service, an interactive game service, or the like. When the terminal 100 is executing a delay-sensitive service, if the communication entity $A_{13}$ disconnects its connection from the network side, so as to initiate RRC connection re-establishment, service experience of the user is affected. In order to avoid or reduce impact on service experience of the user, on the premise that the terminal 100 executes no delay-sensitive service, the communication entity $A_{13}$ can actively disconnect its connection from the network side, and then initiate the RRC connection re-establishment.

In an illustrative example of this embodiment, when the terminal 100 sends a data packet through the communication entity $A_{13}$, the radio link control (radio link control, RLC) layer may identify a service type to which the data packet belongs, and therefore may determine whether the data packet is data for a delay-sensitive service (for example, a voice service, a telemetry service, a teleconferencing service, or an interactive game service). If the data packet is data for a delay-sensitive service, it means that the terminal 100 is executing a delay-sensitive service.

For example, when the terminal 100 is not executing a delay-sensitive service, step 411 and its subsequent steps can be performed.

In some embodiments, when it is determined in step 410a that the primary cell on which the communication entity $A_{13}$ currently camps supports EN-DC, the communication entity $A_{13}$ may further perform step 410b. If in step 410b, it is determined that the communication entity $A_{13}$ has not received a measurement control message of an event $B_1$ or an RRC connection reconfiguration request when the timer $C_1$ expires, the communication entity $A_{13}$ may further perform step 410c. If in step 410c, it is determined that a total number of times that the communication module $A_{23}$ executes service(s) in at least one service within the time period $T_1$ does not exceed n, the communication entity $A_{13}$ may further perform step 410d. When in step 410d, it is determined that the terminal 100 is not running a delay-sensitive application, the communication entity $A_{13}$ performs step 411 and subsequent steps.

Figure 7:
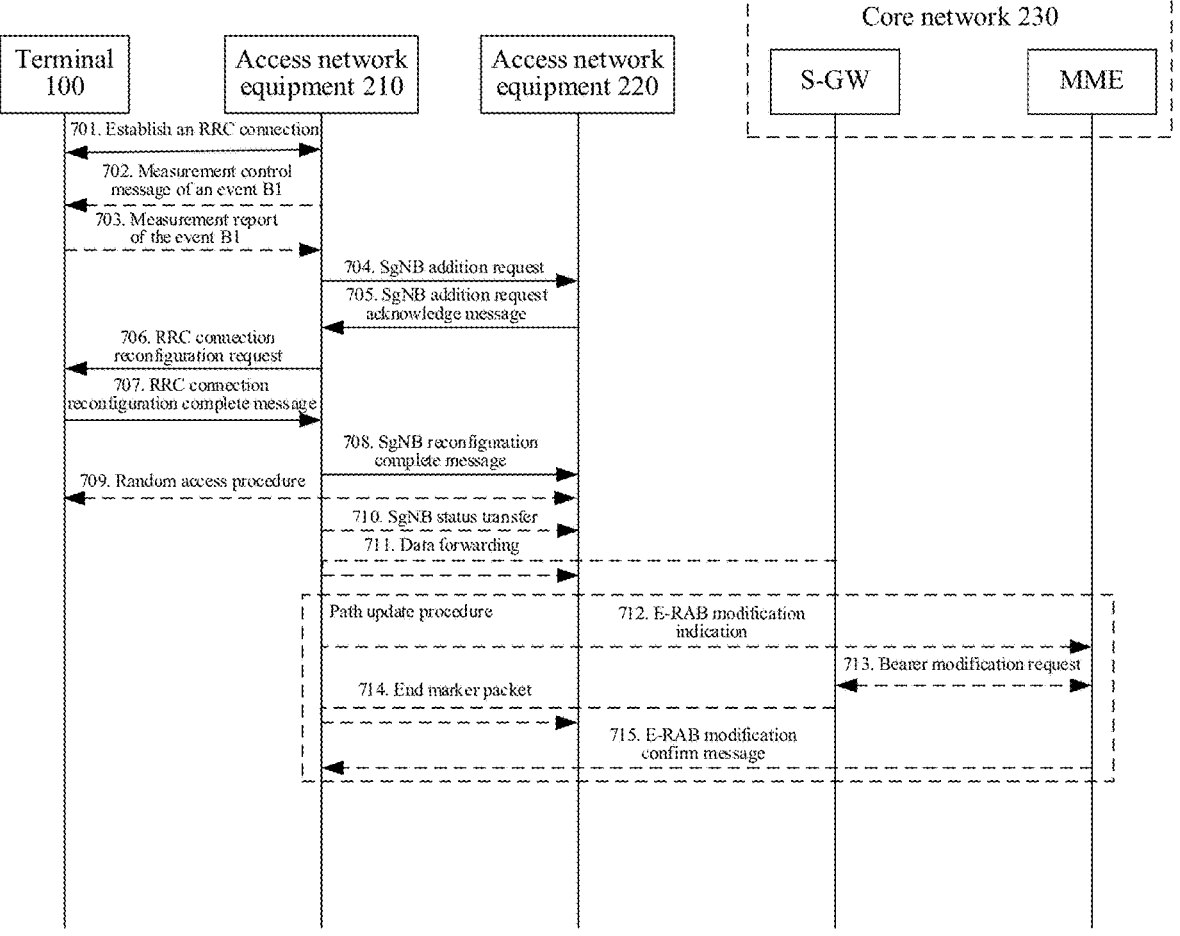
FIG. 7 is a schematic flowchart of a network side adding a secondary cell for a terminal according to an embodiment of this application.

Next, with reference to FIG. 7, a process for a network side to add an SCG for the communication entity $A_{13}$ is described.

As shown in FIG. 7, through step 704 an RRC connection between the communication entity $A_{13}$ and the access network equipment 210 may be established. Specifically, step 701 includes step 412, step 413, and step 414 in FIG. 4C-2.

In some embodiments, the access network equipment 210 may add a secondary cell for the terminal 100 based on a measurement when the communication entity $A_{13}$ is connected to the access network equipment 210. Details are as follows.

The access network equipment 210 may perform step 702, to send a measurement control message of an event $B_1$ to the communication entity $A_{13}$. The communication entity $A_{13}$ may search for a cell provided by the access network equipment 220, in response to the measurement control message of the event $B_1$. When signal quality of the cell provided by the access network equipment 220 is higher than a threshold, the communication entity $A_{13}$ may perform step 703, to send a measurement report of the event $B_1$ to the access network equipment 210. The measurement report of the event $B_1$ is used to report to the access network equipment 210 signal quality of an inter-system neighboring cell as measured by the communication entity $A_{13}$, that is, to report to the access network equipment 210 signal quality of a cell provided by the access network equipment 220 as measured by the communication entity $A_{13}$. In one example, the signal quality of the cell may be characterized by a reference signal receiving power (reference signal receiving power, RSRP) of the cell. In one example, the signal quality of the cell may be characterized by a reference signal received quality (reference signal received quality, RSRQ) of the cell. In one example, the signal quality of the cell may be characterized by a signal to interference plus noise ratio (signal to interference plus noise ratio, SINR) of the cell. In one example, the signal quality of the cell may be characterized by a received signal strength indication (received signal strength indication, SINR) of the cell. In one example, the signal quality of the cell may be jointly characterized by two or more of RSRP, RSRQ, SINR, and RSSI of the cell.

The access network equipment 210 may perform step 704, to send an SgNB addition request (addition request) to the access network equipment 220. SgNB is a gNB as a secondary node. In the EN-DC architecture, the access network equipment 210 may be an eNB, and may be referred to as a MeNB (master eNB) when serving as a master node.

The access network equipment 220 may be a gNB, and may be referred to as an SgNB (secondary gNB) when serving as a secondary node.

The access network equipment 220 may perform step 705, to send an SgNB addition request acknowledge (addition request acknowledge) message to the access network equipment 210.

The access network equipment 210 may perform step 706, to send a radio resource control (radio resource control, RRC) connection reconfiguration (connection reconfiguration) request to the communication entity $A_{13}$.

The communication entity $A_{13}$ may perform step 707, to send an RRC connection reconfiguration complete (connection reconfiguration complete) message to the access network equipment 210.

The access network equipment 210 may perform step 708, to send an SgNB reconfiguration complete (reconfiguration complete) message to the access network equipment 220.

A random access procedure may be performed between the terminal 100 and the access network equipment 220 through step 709. For the random access procedure, reference may be made to the foregoing description, and details are not described here.

Through step 709, the communication entity $A_{13}$ may be connected to the access network equipment 220. In other words, through step 709, an RRC connection between the communication entity $A_{13}$ and the access network equipment 220 is established. Through the foregoing steps, the access network equipment 210 has added a secondary cell (SCG) for the communication entity $A_{13}$. When the access network equipment 210 is an eNB and the access network equipment 220 is a gNB, after step 709, the communication entity $A_{13}$ enters an EN-DC state, which means that the terminal 100 enters the EN-DC state by using the user identity $A_{12}$.

Still referring to FIG. 7, the access network equipment 210 may perform step 710, to send an SgNB status transfer (status transfer) to the access network equipment 220. A service gateway (service gateway, S-GW) in the core network 230, the access network equipment 210, and the access network equipment 220 may perform data forwarding (data forwarding) in step 711.

The access network equipment 210, the access network equipment 220, and the core network 230 may perform a path update procedure (path update procedure). Specifically, the path update procedure may include the following steps:

Step 712. The access network equipment 220 may send an evolved radio access bearer (evolved radio access bearer, E-RAB) modification indication (modification indication) to a mobility management entity (mobility management entity, MME) in the core network 230.

Step 713. The MME sends a bearer modification (bearer modification) request to the S-GW.

Step 714. The serving gateway sends an end marker packet (end marker packet) to the access network equipment 210, and the access network equipment sends the end marker packet to the access network equipment 220.

Step 715. The MME sends an E-RAB modification confirm (modification confirm) message to the access network equipment 210.

Through the foregoing steps, the communication entity $A_{13}$ accesses the core network 230 based on a wireless network provided by the access network device 220.

In some embodiments, the access network equipment 210 may blindly add a secondary cell for the communication entity $A_{13}$ when the communication entity $A_{13}$ is connected to the access network equipment 210. Still referring to FIG. 7, in the process of blindly adding a secondary cell, after the communication entity $A_{13}$ is connected to the access network equipment 210 through step 701, the access network equipment 210 does not perform step 702 (correspondingly, the communication entity $A_{13}$ does not perform step 703 either), but may directly perform step 704 and subsequent steps. In other words, compared with adding a secondary cell based on a measurement, blindly adding a secondary cell omits step 702 and step 704.

For step 704 and subsequent steps in a scheme of blindly adding a secondary cell, reference may be made to the foregoing description of steps 704 to 715, and details are not repeated here.

With the scheme shown in FIG. 7, the communication entity $A_{13}$ may re-access a 5G cell. In other words, with the scheme shown in FIG. 7, an SCG may be added for the communication entity $A_{13}$.

Figure 5E:
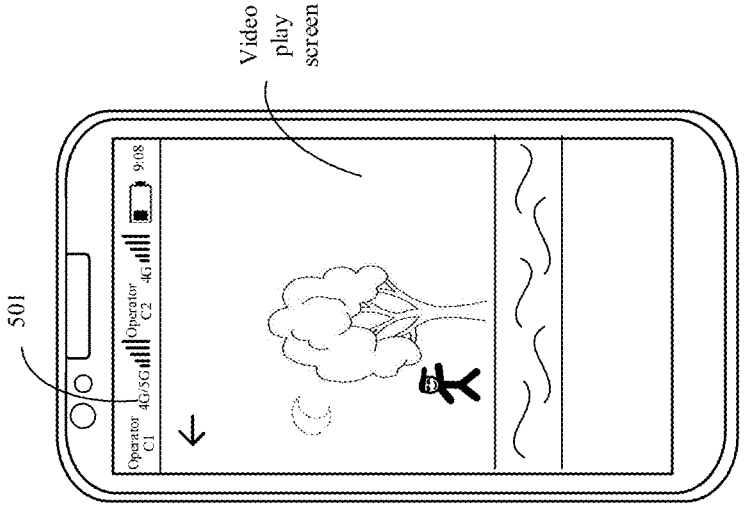
FIG. 5E is a schematic diagram of a user interface according to an embodiment of this application.
Figure 5D:
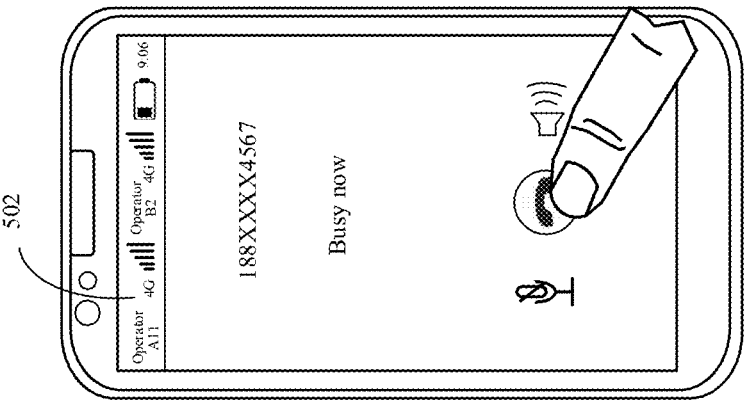
FIG. 5D is a schematic diagram of a user interface according to an embodiment of this application.

In some embodiments, referring to FIG. 5E, when the access network equipment 210 has successfully added an SCG for the communication entity $A_{13}$, the status bar of the terminal 100 may display a 4G/5G dual-network icon 501 corresponding to the SIM card $A_1$. As shown in FIG. 5E, the terminal 100 may transmit service data, such as a video stream of a high-definition video, through a 5G network, so that the high-definition video can be played smoothly, improving viewing experience of the user.

In some embodiments, it can be understood that the access network equipment 210 may fail to add an SCG for the communication entity $A_{13}$. Still referring to FIG. 4C-2, the communication entity $A_{13}$ may perform step 415, to determine whether addition of an SCG is successful. A scheme for determining whether addition of an SCG is successful may be as follows.

Referring to FIG. 7, in one example, the communication entity $A_{13}$ determines whether signal quality of an inter-system neighboring cell is higher than a threshold when measuring the inter-system neighboring cell in response to a measurement control message of an event $B_1$. If the signal quality of the inter-system neighboring cell is not higher than the threshold, it can be determined that the addition of an SCG has failed. In another example, the communication entity $A_{13}$ may determine whether an RRC connection reconfiguration request is received when the timer expires, and if no RRC connection reconfiguration request is received, it can be determined that the addition of an SCG has failed. In still another example, the communication entity $A_{13}$ may determine whether the random access procedure in step 709 has failed. If the random access procedure in step 709 fails (for example, no random access response is received when the timer expires), it can be determined that the addition of an SCG has failed. There are other examples, which are not listed herein one by one.

When the communication entity $A_{13}$ of the access network equipment 210 fails to add an SCG, the communication entity $A_{13}$ may perform step 416 and may list the 4G cell on which it currently camps into a temporary blacklist. When the communication entity $A_{13}$ camps on a cell in the temporary blacklist, the communication entity $A_{13}$ no longer triggers the RRC connection re-establishment, so that step 411 and step 412 are no longer performed, to avoid repeated initiation of the RRC connection re-establishment due to repeated SCG addition failures.

In some embodiments, when the terminal 100 restarts, the communication entity $A_{13}$ may clear the temporary blacklist.

In some embodiments, when a track area update (track area update, TAU) of the communication entity $A_{13}$ occurs, the communication entity $A_{13}$ may clear the temporary blacklist.

In the network access method provided in the embodiments of this application, the dual-card terminal can actively disconnect the RRC connection between the primary card and the network side when a service of the secondary card ends, and actively initiate the RRC connection re-establishment through the primary card, which may trigger the network side to add a secondary cell for the primary card of the terminal as soon as possible, thereby improving network experience of a user.

Figure 8:
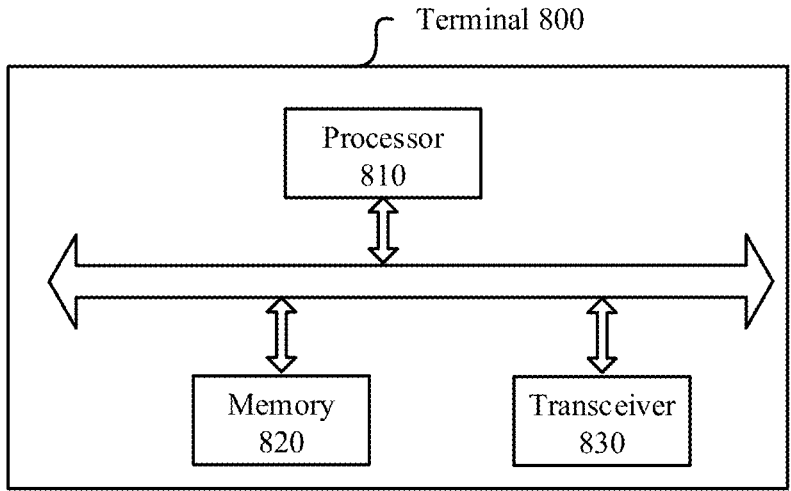
FIG. 8 is a schematic structural diagram of a terminal according to an embodiment of this application.

Referring to FIG. 8, an embodiment of this application provides a terminal 800, and the terminal 800 may be configured with two SIM cards. One of the two SIM cards can be used as a primary card, and the other one can be used as a secondary card. The terminal 800 may include a processor 810, a memory 820, and a transceiver 830. The memory 820 stores an instruction, and the instruction may be executed by the processor 810. When the instruction is executed by the processor 810, the terminal 800 may perform the operations performed by the terminal in the foregoing method embodiments, for example, the operations performed by the terminal 100 in FIGS. 4C-1 and 4C-2. Specifically, the processor 810 may perform data processing operations, and the transceiver 830 may perform data transmission and/or reception operations.

Figure 9:
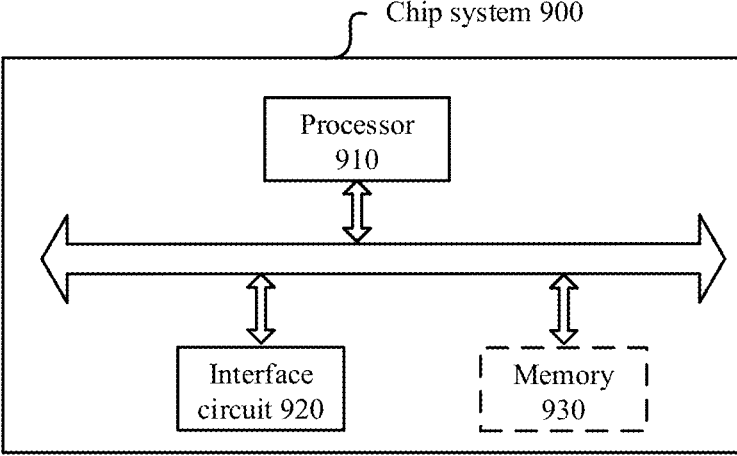
FIG. 9 is a schematic structural diagram of a chip system according to an embodiment of this application.

Referring to FIG. 9, an embodiment of this application provides a chip system 900, which may be applied to a terminal configured with two SIM cards. One of the two SIM cards can be used as a primary card, and the other one can be used as a secondary card. The chip system 900 includes: a processor 910 and an interface circuit 920. The processor 910 is connected to the interface circuit 920, and is configured to perform the operations performed by the terminal in the foregoing method embodiments, for example, the operations performed by the terminal 100 in FIGS. 4C-1 and 4C-2.

In some embodiments, the chip system 900 further includes a memory 930. The memory stores an instruction, and the instruction may be executed by the processor 910. When the instruction is executed by the processor 90, the chip system 900 may perform the operations performed by the terminal in the foregoing method embodiments, for example, the operations performed by the terminal 100 in FIGS. 4C-1 and 4C-2.

It can be understood that the processor in this embodiment of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a transistor logic device, a hardware component, or any combination thereof. The general-purpose processor may be a microprocessor, or may be any conventional processor.

Methods steps in the embodiments of this application may be implemented by hardware, or may be implemented by a processor by executing a software instruction. The software instruction may include a corresponding software module. The software module may be stored in a random access memory (random access memory, RAM), a flash memory, a read-only memory (read-only memory, ROM), a programmable read-only memory (programmable rom, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in an ASIC.

All or some of the foregoing embodiments may be implemented by software, hardware, firmware, or any combination thereof. When the functions are implemented by software, all or some of the functions may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

It can be understood that various numbers in the embodiments of this application are merely for differentiation for ease of description, and are not intended to limit the scope of the embodiments of this application.

What is claimed is:

1. A method, applied to a terminal configured with a first subscriber identity module (SIM) card and a second SIM card, wherein the terminal is simultaneously connected to primary access network equipment of a first network using a first protocol through the first SIM card and secondary access network equipment of a second network using a second protocol through the first SIM card, the terminal is connected to the secondary access network equipment with assistance of the primary access network equipment, and the method comprises:

based on that the terminal executes a first service via the first network through the second SIM card, disconnecting, by the terminal, a second radio resource control (RRC) connection between the terminal and the secondary access network equipment while remaining connected to the primary access network equipment through the first SIM card;

determining, by the terminal, that the first service through the second SIM card ends;

actively disconnecting, by the terminal, a first RRC connection between the terminal and the primary access network equipment through the first SIM card; and sending, by the terminal, an RRC connection re-establishment request to the primary access network equipment, so that the terminal is reconnected to the primary access network equipment of the first network through the first SIM card and the secondary access network equipment of the second network through the first SIM card with assistance of the primary access network equipment.

2. The method according to claim 1, wherein the actively disconnecting, by the terminal, the first RRC connection between the terminal and the primary access network equipment, and the sending the RRC connection re-establishment request to the primary access network equipment comprise:

when a first cell on which the terminal camps through the first SIM card at an end of the first service supports dual connectivity, actively disconnecting, by the terminal, the first RRC connection between the terminal and the primary access network equipment, and sending the RRC connection re-establishment request to the primary access network equipment.

3. The method according to claim 2, wherein the dual connectivity is universal terrestrial radio access network-new radio dual connectivity (EN-DC).

4. The method according to claim 1, wherein the actively disconnecting, by the terminal, the first RRC connection between the terminal and the primary access network equipment, and the sending the RRC connection re-establishment request to the primary access network equipment comprise:

when the terminal does not receive a measurement control message of an event or an RRC connection reconfiguration request through the first SIM card within a first time period, actively disconnecting, by the terminal, the first RRC connection between the terminal and the primary access network equipment, and sending the RRC connection re-establishment request to the primary access network equipment, wherein the first time period is a time period that starts when the first service ends.

5. The method according to claim 1, wherein the actively disconnecting, by the terminal, the first RRC connection between the terminal and the primary access network equipment, and the sending the RRC connection re-establishment request to the primary access network equipment comprise:

when a total number of times that the terminal executes service(s) in at least one service through the second SIM card within a second time period is less than or equal to n, actively disconnecting, by the terminal, the first RRC connection between the terminal and the primary access network equipment, and sending the RRC connection re-establishment request to the primary access network equipment, wherein n is a preset integer greater than 1, the second time period is a time period that terminates when the first service ends, and the first service is one of the at least one service.

6. The method according to claim 5, wherein the at least one service comprises at least one of:

a voice service corresponding to the second SIM card or a multimedia messaging service corresponding to the second SIM card.

7. The method according to claim 1, wherein the actively disconnecting, by the terminal, the first RRC connection between the terminal and the primary access network equipment, and the sending the RRC connection re-establishment request to the primary access network equipment comprise:

when the terminal runs no delay-sensitive application, actively disconnecting, by the terminal, the first RRC connection between the terminal and the primary access network equipment, and sending the RRC connection re-establishment request to the primary access network equipment; or when the terminal executes no delay-sensitive service, actively disconnecting, by the terminal, the first RRC connection between the terminal and the primary access network equipment, and sending the RRC connection re-establishment request to the primary access network equipment.

8. The method according to claim 1, wherein after the actively disconnecting, by the terminal, the first RRC connection between the terminal and the primary access network equipment, and the sending the RRC connection re-establishment request to the primary access network equipment, the method further comprises:

listing, by the terminal, a cell on which the terminal currently camps through the first SIM card into a first list when the terminal fails to connect to the secondary access network equipment through the first SIM card, wherein when the terminal camps on a cell in the first list through the first SIM card, the terminal no longer sends any RRC connection re-establishment request to the primary access network equipment.

9. The method according to claim 8, wherein the method further comprises:

clearing, by the terminal, the first list when the terminal restarts, or when a tracking area of a wireless network accessed by the terminal through the first SIM card changes.

10. The method according to claim 1, wherein the primary access network equipment is 4th generation (4G) access network equipment, and the secondary access network equipment is 5th generation (5G) access network equipment.

11. A terminal, wherein the terminal is configured with a first subscriber identity module (SIM) card and a second SIM card, the terminal is simultaneously connected to primary access network equipment of a first network using a first protocol through the first SIM card and secondary access network equipment of a second network using a second protocol through the first SIM card, and the terminal is connected to the secondary access network equipment with assistance of the primary access network equipment;

the terminal comprises a processor, a memory, and a transceiver, wherein the memory is configured to store a computer instruction; and when the terminal operates, the processor executes the computer instruction, so that the terminal performs:

based on that the terminal executes a first service via the first network through the second SIM card, disconnecting a second radio resource control (RRC) connection between the terminal and the secondary access network equipment while remaining connected to the primary access network equipment through the first SIM card;

determining that the first service through the second SIM card ends;

actively disconnecting a first RRC connection between the terminal and the primary access network equipment through the first SIM card; and sending an RRC connection re-establishment request to the primary access network equipment, so that the terminal is reconnected to the primary access network equipment of the first network through the first SIM card and the secondary access network equipment of the second network through the first SIM card with assistance of the primary access network equipment.

12. The terminal according to claim 11, wherein the processor executes the computer instruction, so that the terminal further performs:

when a first cell on which the terminal camps through the first SIM card at an end of the first service supports dual connectivity, actively disconnecting the first RRC connection between the terminal and the primary access network equipment, and sending the RRC connection re-establishment request to the primary access network equipment.

13. The terminal according to claim 12, wherein the dual connectivity is universal terrestrial radio access network-new radio dual connectivity (EN-DC).

14. The terminal according to claim 11, wherein the processor executes the computer instruction, so that the terminal further performs:

when the terminal does not receive a measurement control message of an event or an RRC connection reconfiguration request through the first SIM card within a first time period, actively disconnecting the first RRC connection between the terminal and the primary access network equipment, and sending the RRC connection re-establishment request to the primary access network equipment, wherein the first time period is a time period that starts when the first service ends.

15. The terminal according to claim 11, wherein the processor executes the computer instruction, so that the terminal further performs:

when a total number of times that the terminal executes service(s) in at least one service through the second SIM card within a second time period is less than or equal to n, actively disconnecting the first RRC connection between the terminal and the primary access network equipment, and sending the RRC connection re-establishment request to the primary access network equipment, wherein n is a preset integer greater than 1, the second time period is a time period that terminates when the first service ends, and the first service is one of the at least one service.

16. The terminal according to claim 15, wherein the at least one service comprises at least one of:

a voice service corresponding to the second SIM card or a multimedia messaging service corresponding to the second SIM card.

17. The terminal according to claim 11, wherein the processor executes the computer instruction, so that the terminal further performs:

when the terminal runs no delay-sensitive application, actively disconnecting the first RRC connection between the terminal and the primary access network equipment, and sending the RRC connection re-establishment request to the primary access network equipment; or when the terminal executes no delay-sensitive service, actively disconnecting the first RRC connection between the terminal and the primary access network equipment, and sending the RRC connection re-establishment request to the primary access network equipment.

18. The terminal according to claim 11, wherein after the actively disconnecting the first RRC connection between the terminal and the primary access network equipment, and the sending the RRC connection re-establishment request to the primary access network equipment, the processor executes the computer instruction, so that the terminal further performs:

listing a cell on which the terminal currently camps through the first SIM card into a first list when the terminal fails to connect to the secondary access network equipment through the first SIM card, wherein when the terminal camps on a cell in the first list through the first SIM card, the terminal no longer sends any RRC connection re-establishment request to the primary access network equipment.

19. The terminal according to claim 18, wherein the processor executes the computer instruction, so that the terminal further performs:

clearing the first list when the terminal restarts, or when a tracking area of a wireless network accessed by the terminal through the first SIM card changes.

20. The terminal according to claim 11, wherein the primary access network equipment is 4th generation (4G) access network equipment, and the secondary access network equipment is 5th generation (5G) access network equipment.

\* \* \* \* \*